United States Patent [19]
Clark et al.

[11] Patent Number: 4,968,940
[45] Date of Patent: Nov. 6, 1990

[54] WELL LOGGING APPARATUS AND METHOD USING TWO SPACED APART TRANSMITTERS WITH TWO RECEIVERS LOCATED BETWEEN THE TRANSMITTERS

[75] Inventors: Brian Clark; Jacques Jundt; Martin Luling, all of Missouri City; Michael O. Ross, Needville, all of Tex.

[73] Assignee: Schlumberger Technology Corporation, Houston, Tex.

[21] Appl. No.: 368,614

[22] Filed: Jun. 20, 1989

Related U.S. Application Data

[62] Division of Ser. No. 115,503, Oct. 30, 1987, Pat. No. 4,899,112.

[51] Int. Cl.5 .......................... G01V 3/18; G01V 3/12
[52] U.S. Cl. .................................................. 324/338
[58] Field of Search ............... 324/333, 335, 338, 339, 324/340, 341, 342, 343

[56] References Cited

U.S. PATENT DOCUMENTS

| | | | |
|---|---|---|---|
| 3,305,771 | 2/1967 | Hrps | 324/6 |
| 3,551,797 | 9/1967 | Gouilloud et al. | 324/6 |
| 3,849,721 | 11/1974 | Calvert | 324/338 |
| 4,107,597 | 8/1978 | Meador et al. | 324/6 |
| 4,185,238 | 1/1980 | Huchital et al. | 324/338 |
| 4,209,747 | 6/1980 | Huchital | 324/338 |
| 4,278,941 | 7/1981 | Freedman | 324/341 |
| 4,300,098 | 11/1981 | Huchital et al. | 324/338 |
| 4,451,789 | 5/1984 | Meador | 324/338 |
| 4,511,842 | 4/1985 | Moran et al. | 324/338 |
| 4,511,843 | 4/1985 | Thoraval | 324/338 |
| 4,536,714 | 8/1985 | Clark | 324/338 |
| 4,538,109 | 8/1985 | Clark | 324/338 |
| 4,553,097 | 11/1985 | Clark | 324/338 |
| 4,622,518 | 11/1986 | Cox et al. | 324/341 |
| 4,626,785 | 12/1986 | Hagiwara | 324/339 |
| 4,651,101 | 3/1987 | Barber et al. | 324/339 |
| 4,692,706 | 9/1987 | Mazzagatti et al. | 324/338 |
| 4,730,161 | 3/1988 | Cox et al. | 324/338 |

FOREIGN PATENT DOCUMENTS 2146126 4/1985 United Kingdom .

OTHER PUBLICATIONS

Franz, "Downhole Recording System for MWD", SPE 10054, Oct., 1981.
Rodney et al., "The Electromagnetic Wave Resistivity MWD Tool", SPE 12167, Oct., 1983.
Coope et al., "Formation Evaluation Using Measurements Recorded While Drilling", SPWLA Twenty-Fifth Annual Logging Symposium, Jun., 1984.
Coope et al., "The Theory of 2 MHz Resistivity Tool and Its Application to Measurement-While-Drilling", The Log Analyst, May–Jun., 1984.
Hendricks et al., "MWD: Formation Evaluation Case Histories in the Gulf of Mexico", SPE 13187, Sep., 1984.
Holbrook, "The Effect of Mud Filtrate Invasion on the EWR Log—A Case History", SPWLA Twenty-Sixth Annual Logging Symposium, Jun., 1985.
Coope et al., "Formation Evaluation Using EWR Logs", SPE 14062, Mar., 1986.
Rodney et al., "Electromagnetic Wave Resistivity MWD Tool", SPE Drilling Engineering, Oct., 1986.
Grief et al., "Petrophysical Evaluation of Thinly Bedded Reservoirs in High Angle/Displacement Development Wells with the NL Recorded Lithology Logging System", The Log Analyst, Sep.–Oct., 1986.
Gianzero et al., "A New Resistivity Tool for Measurement-While-Drilling", SPWLA Twenty-Sixth Annual Logging Symposium, Jun., 1985.

(List continued on next page.)

*Primary Examiner*—Reinhard J. Eisenzopf
*Assistant Examiner*—Walter E. Snow
*Attorney, Agent, or Firm*—John J. Ryberg; Martin Novack; Stephen L. Borst

[57] ABSTRACT

Well logging techniques and apparatus are disclosed for determining formation resistivity at different radial depths of investigation and with greater accuracy than prior techniques, for determining the existence, locations and properties of beds and caves, and for determining changes in the size of a borehole.

8 Claims, 28 Drawing Sheets

OTHER PUBLICATIONS

Gianzero et al., "Determining the Invasion near the Bit with the M.W.D. Toroid Sonde", SPWLA Twenty-Seventh Annual Logging Symposium, Jun., 1986.

Chin et al., "Formation Evaluation Using Repeated MWD Logging Measurements", SPWLA 27th Annual Logging Symposium, Houston, Texas, Jun. 9-13, 1986.

Coope et al., "Evaluation of Thin Beds and Low Resistivity Pays Using EWR Logs", Transactions of the Tenth European Formation Evaluation Symposium, Aberdeen, Scotland, Apr. 22, 1986.

"Drillcom" Literature: RLL Recorded Lithology Logging System, Measurements While Drilling Technical Specifications, 1985.

Elliott et al., "Recording Downhole Formation Data While Drilling", Journal of Petroleum Technology, Jul. 1985.

Koopersmith et al., "Environmental Parameters Affecting Neutron Porosity, Gamma Ray, and Resistivity Measurements Made While Drilling", Society of Petroleum Engineers publication SPE 16758, Sep. 27-30, 1987.

Huchital et al., The Deep Propagation Tool, Society of Petroleum Engineers, SPE 10988, 1981.

Besson et al., Environmental Effects on Deep Electromagnetic Logging Tools, SPWLA, Jun., 1986.

Blenkinsop et al., Deep Electromagnetic Propagation Tool Interpretation, SPWLA, Jun. 1986.

Log Interpretation Principles/Applications, pp. 132, 133, 137, Oct., 1987.

LINES OF CONSTANT PHASE AROUND A SOURCE AT T

LINES OF CONSTANT AMPLITUDE AROUND A SOURCE

| σ S/M | R OHM-M | $\epsilon'$ MIN MAX | $k'$ MIN MAX | $k''$ MIN MAX | $\frac{\Delta k'}{k'} \times 100\%$ | $\frac{\Delta k''}{k''} \times 100\%$ |
|---|---|---|---|---|---|---|
| 1 | 1 | 85 300 | 2.823 2.857 | 2.797 2.763 | 1% | 1% |
| .1 | 10 | 15 110 | .896 .945 | .881 .836 | 5% | 5% |
| .01 | 100 | 5 43 | .289 .354 | .273 .223 | 22% | 18% |
| .001 | 1000 | 5 15 | .116 .174 | .068 .046 | 33% | 33% |

FIG.13

DOWNHOLE PROPAGATION

UPHOLE PROPAGATION

WELL LOGGING APPARATUS AND METHOD USING TWO SPACED APART TRANSMITTERS WITH TWO RECEIVERS LOCATED BETWEEN THE TRANSMITTERS

This is a divisional of copending U.S. application Ser. No. 115,503 filed Oct. 30, 1987, now U.S. Pat. No. 4,899,112.

BACKGROUND OF THE INVENTION

This invention relates to the field of well logging and, more particularly, to well logging techniques and apparatus for determining formation resistivity at different radial depths of investigation and with greater accuracy than prior techniques, for determining the existence, locations and properties of beds and caves, and for determining changes in the size of an earth borehole. The invention has general application in the well logging art, but is particularly useful in measuring while drilling.

A commonly used technique for evaluating formations surrounding an earth borehole is resistivity logging. Porous formations having high resistivity generally indicate the presence of hydrocarbons, while porous formations with low resistivity are generally water saturated. However, the region immediately surrounding the borehole can be invaded by borehole fluid or mud filtrate and have a different resistivity than the virgin formation. If a resistivity logging device has only one radial depth of investigation, there is limited ability to measure resistivity of all zones of interest, and there may be difficulty in determining if the measured resistivity represents the invaded zone, the virgin zone, or some combination of the two zones. However, if the resistivity logging device has at least two radial depths of investigation, there is much greater flexibility. In addition to the advantage of having, for example, a shallow measurement and a deep measurement individually, the combination of the two provides additional information such as the extent of invasion. It is also possible to use the shallow reading to correct the deeper reading and thereby obtain a better estimate of the true formation resistivity.

Therefore, wireline resistivity logging tools usually are provided with two or more radial depths of investigation. Common wireline resistivity logging tools achieve two depths of investigation by using a short and a long vertical array of electrodes or coils. In general, a long vertical array provides a greater radial depth of investigation than does a short vertical array.

A type of well logging which is of interest herein is so-called electromagnetic propagation logging, which can be used to measure the resistivity of the formation surrounding a borehole. For example, U.S. Pat. No. 3,551,797 describes a technique wherein electromagnetic energy is transmitted into the formation, and energy shed back into the borehole is measured at a receiver pair to determine the attenuation and/or the phase shift of the electromagnetic energy propagating in the formation. (In this type of device, a receiver pair is generally used in so-called "differential receiver" arrangement to facilitate the accurate measurement of attenuation and/or phase shift of the formations.) This patent teaches that by using more than one vertical spacing between a transmitter and different receiver pairs, different radial depths of investigation can be attained. For example, a relatively close (to the transmitter) receiver pair can be utilized to obtain attenuation and/or phase information from which the properties of the invaded zone are determined, and measurements of attenuation and/or phase from a relatively far (from the transmitter) pair of receivers can be utilized to obtain the properties of the deeper virgin formations. In this U.S. Pat. No. 3,551,797, the concern is largely with obtaining conductivity. Either attenuation or phase shift can be utilized therein to determine the skin depth for the formation, with the conductivity then being determinable from the skin depth. Below a certain frequency range, the skin depth of the electromagnetic energy can be calculated using either attenuation or phase information, since displacement currents have minimal effect.

Various other techniques exist in the art for utilizing extra receivers to investigate resistivity at different depths of investigation. For example, in U.S. Pat. Nos. 4,451,789 and 4,107,597 three receiver coils are used in obtaining different radial depths of investigation.

A technique also of interest as background herein is disclosed in U.S. Pat. No. 4,209,747, which describes an electromagnetic method and apparatus for determining the dielectric constant and/or the conductivity of formations. This patent observes that when electromagnetic energy is emitted from a first location in a borehole, the volume and shape of the formations which affect a measurement of wave energy attenuation as measured at the second location is different than the volume and shape of the formations which affect a measurement of relative phase of the electromagnetic energy received at the second location. In particular, the attenuation measurement is a deeper measurement than the phase shift measurement. This principle is referred to and exploited in a form of the present invention. The '747 patent describes a method and apparatus in which means are provided for generating electromagnetic energy at a first location in the borehole. Further means are provided for detecting attenuation at a second location in the borehole, and further means are provided for measuring phase shift at a third location in the borehole. The third location is farther from the transmitter than the second location. The attenuation and phase shift are measured at each location by differential receiver pairs, so there are four receivers used. The attenuation measured at the second location and the phase shift measured at the third location have substantially the same depth of investigation. Therefore, these two quantities are used to determine the dielectric constant and/or conductivity for the same regions of the formation. The '747 patent is largely concerned with improved accuracy in the determination of dielectric constant and/or conductivity, and a preferred frequency for the technique is 20 MHz, where displacement currents are substantial, so that dielectric constant is a measurable quantity in formations typically encountered in well logging.

While it is very advantageous to have measurements of formation resistivity at different depths of investigation, prior art techniques which require different receiver spacings to achieve this end generally suffer one or more of the following drawbacks: the need for additional receivers, increase in the length of the logging device to accommodate the different spacings; additional circuitry and wiring; higher cost. These drawbacks can be significant in wireline logging, but tend to be even more serious in measurement while drilling systems, wherein the measuring environment is particularly hostile, and stricter requirements are usually imposed on the acceptable length and the mechanical strength of the logging apparatus. (Examples of electromagnetic logging devices used in measuring while drilling are set forth in British Published Application No. 2,146,126 and U.S. Pat. No. 4,553,097. In these patents, a transmitter and a receiver pair are mounted recessed in a drill collar, and amplitude and/or phase measurements are taken. One depth of investigation is obtained.) To minimize the possibility of mechanical damage, and to maintain the mechanical strength of the drill string, the number of sensors and the total length of the sensors should be minimized.

It is among the objects of the present invention to provide an improved apparatus and method for determining formation resistivity at different depths of investigation. It is also among the objects hereof to devise such an apparatus and method and have it be suitable and advantageous for use in measurement while drilling.

In the prior art, so-called "borehole compensation" has been used to advantage in certain types of logging devices. For example, the technique has been commonly employed in acoustic logging, has been utilized in electromagnetic logging pad-mounted devices (see e.g. U.S. Pat. No. 3,849,721), and has also been suggested for use in a centralized electromagnetic logging device using transverse magnetic mode components of the electromagnetic energy (see U.S. Pat. No. 4,553,097). In a typical borehole compensated logging device, a pair of receivers are located between two transmitters. The transmitters are alternately energized, and the signals received at the receivers can be processed (generally, averaged) to reduce or eliminate the effects of factors such as the logging device being eccentered in the borehole and irregularities of the borehole or mudcake. In various well logging applications, borehole compensation has apparently not been considered practical. The need for transmitters on both sides of the receiver pair means that the logging device must be substantially longer than the length of the same device if it had only a single transmitter. For logging devices which have a relatively long transmitter-to-receiver spacing to begin with, a further transmitter on the other side of the receivers may render the device longer and more cumbersome than is acceptable. A further problem which can arise as as consequence of having transmitters on both sides of the device receivers is the additional noise encountered at the receivers as a result of having a second transmitter. One source of this noise is the cross talk from the wires which carry high power energizing signals to the second transmitter. Assuming that the energizing signals for both transmitters come from a common source, then the wiring coupling the energizing source to one of the transmitters must run past the receivers. Since the energizing signals are much larger than the received signals, the signals at the receivers are particularly susceptible to contamination by noise from high amplitude transmitter signals passing nearby. Furthermore, in logging devices which have relatively long transmitter-to-receiver spacings, the signals received at the receivers are relatively weak (as compared to the same device if it had shorter spacings), and the problem of cross-talk from the transmitter wiring is exacerbated.

For the reasons just set forth, among others, it would be expected that borehole compensation in an electromagnetic propagation logging device utilized for logging-while-drilling would be particularly problematic. In addition to the difficulties already described, the noise and other instabilities caused by the drilling environment can render the task even more difficult. Further, considerations of the length of the logging-while-drilling apparatus (including the factor of mechanical strength) are not conducive to the use of features that typically tend to require increased device length; namely, provision for different depths of investigation, and employment of borehole compensation.

It is among the objects of the present invention to provide a practical borehole compensation capability for a mandrel type of electromagnetic propagation logging system, and for such a system as utilized for logging while drilling.

There are various techniques in the well logging art for determining the presence, conductivity, and location of beds in formations surrounding a borehole and for determining the location and size of borehole caves. Generally, these techniques can stand improvement in one or more of the following aspects: difficulty in recognizing the presence of a thin bed; difficulty in determining the conductivity of a thin bed; confusion of a thin bed with a cave; difficulty in obtaining the location of the boundaries of beds and caves with good accuracy; complexity of the equipment and/or processing techniques needed to obtain the desired information. It is among the objects of the invention to provide improvement in these areas, and to provide improvements which are applicable for use in measurement while drilling.

Using a mechanical caliper to measure the diameter of an oil well borehole is a well known technique in wireline logging. A borehole caliper log contains useful information about the subsurface formations. For example, the borehole diameter can be used to differentiate between shales and sandstones since boreholes tend to wash-out in the shales whereas boreholes tend to remain at the bit size in the sandstones. A caliper log can be used as an aid in interpreting other logs which are sensitive to the borehole diameter. A caliper log is also used to compute the amount of cement required for well casing. It can also be used to aid a drilling program by identifying sections of the well where the drill string might stick and by evaluating the effectiveness of the mud program in preventing swelling or caving of the borehole.

Wireline caliper tools generally use moveable arms which expand and contact the borehole wall. Typically, the caliper tool is lowered into the borehole on a wireline cable with the moveable arms in a retracted position so that they do not contact the borehole wall. The arms are engaged with the borehole wall when the tool is pulled out of the well by the wireline cable. Application of moveable arm calipers to measurement while drilling would be very difficult because of the very harsh mechanical environment.

It is among the objects of the present invention to provide an improved technique for measuring changes in borehole diameter, and to provide improvements which are applicable to measurement while drilling.

SUMMARY OF THE INVENTION

The present invention is directed to a well logging apparatus having features that are responsive to a number of needs of the prior art, as discussed above. Most of the features of the invention as set forth herein generally have application to both so-called wireline logging and to so-called measuring while drilling. However, some of the features hereof are particularly advantageous for use in a measuring while drilling apparatus.

In accordance with a feature of the invention, there is provided an apparatus and method for investigating earth formations in which resistivity is determined at two different depths of investigation (which means, throughout, radial depth of investigation) while using signals received at only a single pair of receivers operating in differential arrangement. [In the present application, any references to determination or use of resistivity are intended to generically mean conductivity as well, and vice versa. These quantities are reciprocals, and mention of one or the other herein is for convenience of description, and not intended in a limiting sense.] In an embodiment of this form of the invention, electromagnetic wave energy is generated at a first location in the borehole, and is received at second and third locations in the borehole that are successively spaced longitudinally in the borehole from the first location. The phase shift is detected between electromagnetic energy received at the second and third locations in the borehole. Also, the attenuation is detected between electromagnetic energy received at the second and third locations in the borehole. (As used herein, "phase shift" and "attenuation" are intended to be non-limiting with regard to how the measurements are made. For example, the phase shift of the energy received at the two receivers can be determined by comparing the received signals directly, or by detecting each signal against a reference such as the transmitted signal and comparing the results, or by any other suitable technique. As a further example, attenuation can be determined by direct comparison of receiver signal amplitudes, or by measurement of each receiver signal amplitude with respect to a reference and comparing the results, or by any other suitable technique.) The resistivity of formations at a relatively shallow depth of investigation around the second and third locations is then determined as a function of the detected phase shift. Also, the resistivity of formations at a relatively deep depth of investigation around the second and third locations is determined as a function of the detected attenuation. In an illustrated embodiment of this form of the invention, the determination of resistivity involves application of a transform from phase shift, or from attenuation, to resistivity. The transform utilizes a correlation between the dielectric permittivity and conductivity of earth formations.

In accordance with another feature of the present invention, there is provided an electromagnetic logging apparatus and method wherein a logging device is designed for movement generally centrally through a borehole, upper and lower transmitters are formed in the logging device, and upper and lower receivers are located between the upper and lower transmitters, in symmetrical relation therewith, and on a substantially common axis therewith. Transverse electric electromagnetic energy is transmitted alternately from the transmitters, and the signals received at the receivers are utilized in a borehole compensated type of arrangement. Thus, borehole compensation, which has been previously successfully employed in pad-type devices, is now utilized to advantage in an electromagnetic propagation logging device that employs transverse electric mode and moves generally centrally through the borehole. In the illustrated form of the invention, the logging device is formed in a section of drill collar for use in a logging while drilling system, although this form of the invention has application as well to a mandrel type of wireline logging device.

As described further hereinbelow, the present invention has features which are particularly advantageous for use in a logging while drilling system in that, inter alia, two depths of investigation are available from a single receiver pair, and the construction of the device further facilitates the use of borehole compensation by avoiding problems that occur with prior art approaches. Also, the signals obtained at the receivers from the two different transmitters can be utilized to obtain phase imbalance and amplitude imbalance signals that provide useful information pertaining to characteristics of the formations and, particularly, the borehole diameter.

In an embodiment of the logging device of the present invention, each antenna is formed in a recess in a metal housing, which is a section of drill collar in the embodiment set forth. A layer of insulating material, preferably comprising fiberglass epoxy, is disposed on the recess, and a coil is wound on this first layer of insulating material. A rubber layer covers the coil and the layer of insulating material below, and a slotted shield covers the rubber layer. The defined combination of structure and materials is advantageous in withstanding the combined effects of pressure, temperature, and water incursion that are encountered in the borehole environment, and are particularly severe during drilling. Further, in this preferred structure, compartments are formed in the housing in close proximity to respective receiving coils. The compartments contain impedance matching and preamplification circuits for the receiver signals, so that these signals are immediately amplified before they are coupled through regions of the device where they may be contaminated by noise, such as from the wires carrying the transmitter signals. Thus, the structural features of the logging device as set forth further facilitate the use of borehole compensation in an electromagnetic propagation logging device of a mandrel-type, especially for use in a measurement while drilling apparatus.

In accordance with a further feature of the invention, there is disclosed an apparatus and method for determining the presence of a cave in the borehole, and for distinguishing a cave from a thin bed. In a disclosed embodiment thereof, the resistivities determined from the phase shift measurement and the attenuation measurement are compared, and an indication of a cave is generated when there is a substantial change in the resistivity determined from the detected phase shift measurements without a corresponding substantial change occurring in the resistivity determined from the detected attenuation measurements.

In accordance with another feature of the present invention, there is disclosed an apparatus and technique for determining conductivity bed boundaries in the formations. As described further hereinbelow, Applicant has discovered that the location of bed boundaries can be determined with good accuracy from the crossovers between the resistivity determined from phase shift measurements and the resistivity determined from attenuation measurements. In a disclosed embodiment hereof, the depth level is determined at which there is a crossover of the resistivity determined from the phase shift and the resistivity determined from the attenuation. The determined depth level is stored as a bed boundary. In a form of this embodiment, the determination of the depth level of the boundary includes interpolating between depth levels at which the measured crossover has occurred.

Further features and advantages of the invention will become more readily apparent from the following detailed description when taken in conjunction with the accompanying drawings.

BRIEF DESCRIPTION OF THE DRAWINGS

FIG. 13 is a table which lists minimum and maximum values of dielectric constant for specific values of conductivity.

DESCRIPTION OF THE PREFERRED EMBODIMENTS

Figure 1:
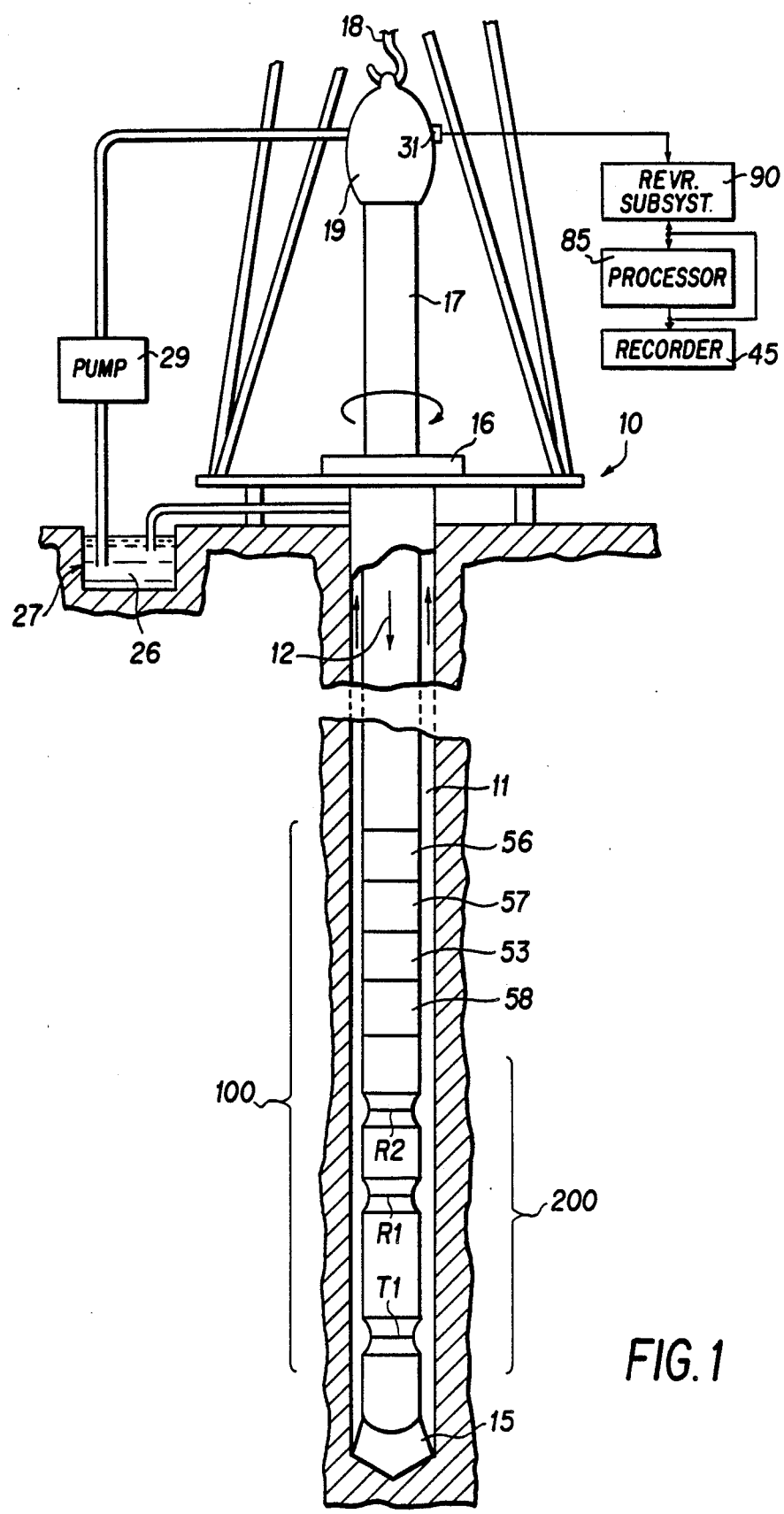
FIG. 1 is a diagram of a system in which an embodiment of the invention can be employed, and which can be used to practice an embodiment of the method of the invention.

Referring to FIG. 1, there is illustrated an embodiment of the invention in the form of a logging-while-drilling apparatus and method. A platform and derrick 10 are positioned over a borehole 11 that is formed in the earth by rotary drilling. A drill string 12 is suspended within the borehole and includes a drill bit 15 at its lower end. The drill string 12, and the drill 15 attached thereto, is rotated by a rotating table 16 (energized by means not shown) which engages a kelly 17 at the upper end of the drill string. The drill string is suspended from a hook 18 attached to a travelling block (not shown). The kelly is connected to the hook through a rotary swivel 19 which permits rotation of the drill string relative to the hook. Drilling fluid or mud 26 is contained in a pit 27 in the earth. A pump 29 pumps the drilling fluid into the drill string via a port in the swivel 19 to flow downward through the center of drill string 12. The drilling fluid exits the drill string via ports in the drill bit 15 and then circulates upward in the region between the outside of the drill string and the periphery of the borehole. As is well known, the drilling fluid thereby carries formation cuttings to the surface of the earth, and the drilling fluid is returned to the pit 27 for recirculation. The small arrows in the FIGURE illustrate the typical direction of flow of the drilling fluid.

Mounted within the drill string 12, preferably near the drill bit 15, is a downhole sensing, processing, storing and and transmitting subsystem 100. Subsystem 100 includes a measuring apparatus 200 which includes at least antennas T1, R1, and R2, and operates in the manner described hereinbelow. A transmitting portion of the downhole subsystem includes an acoustic transmitter 56, which generates an acoustic signal in the drilling fluid that is representative of the measured downhole conditions. One suitable type of acoustic transmitter, which is known in the art, employs a device known as a "mud siren" which includes a slotted stator and a slotted rotor that rotates and repeatedly interrupts the flow of drilling fluid to establish a desired acoustic wave signal in the drilling fluid. The generated acoustic mud wave travels upward in the fluid through the center of the drill string at the speed of sound in the fluid. The acoustic wave is received at the surface of the earth by transducers represented by reference numeral 31. The transducers, which are, for example, piezoelectric transducers, convert the received acoustic signals to electronic signals. The output of the transducers 31 is coupled to the uphole receiving subsystem 90 which is operative to demodulate the transmitted signals, which are then coupled to processor 85 and recorder 45.

Transmitter 56 is controlled by transmitter control and driving electronics 57 which includes analog-to-digital (A/D) circuitry that converts the signals representative of downhole conditions into digital form. The control and driving electronics 57 may also include a suitable modulator, such as a phase shift keying (PSK) modulator, which conventionally produces driving signals for application to the transmitter 56. These driving signals can be used to apply appropriate modulation to the mud siren of transmitter 56. It will be understood that alternative techniques can be employed for communicating logging information to the surface of the earth.

The downhole subsystem 100 further includes acquisition and processor electronics 58. These electronics include a microprocessor (with associated memory, clock circuitry, and interface circuitry), and processing circuitry. The acquisition and processor electronics 58 are coupled to the measuring apparatus 200 and obtain measurement information therefrom. The acquisition and processor electronics is capable of storing data from the measuring apparatus, processing the data and storing the results, and coupling any desired portion of the information it contains to the transmitter control and driving electronics 57 for transmission to the surface by transmitter 56. A battery 53 may provide downhole power. As known in the art, a downhole generator (not shown) such as a so-called "mud turbine" powered by the drilling fluid, can also be utilized to provide power during drilling.

Figure 2:
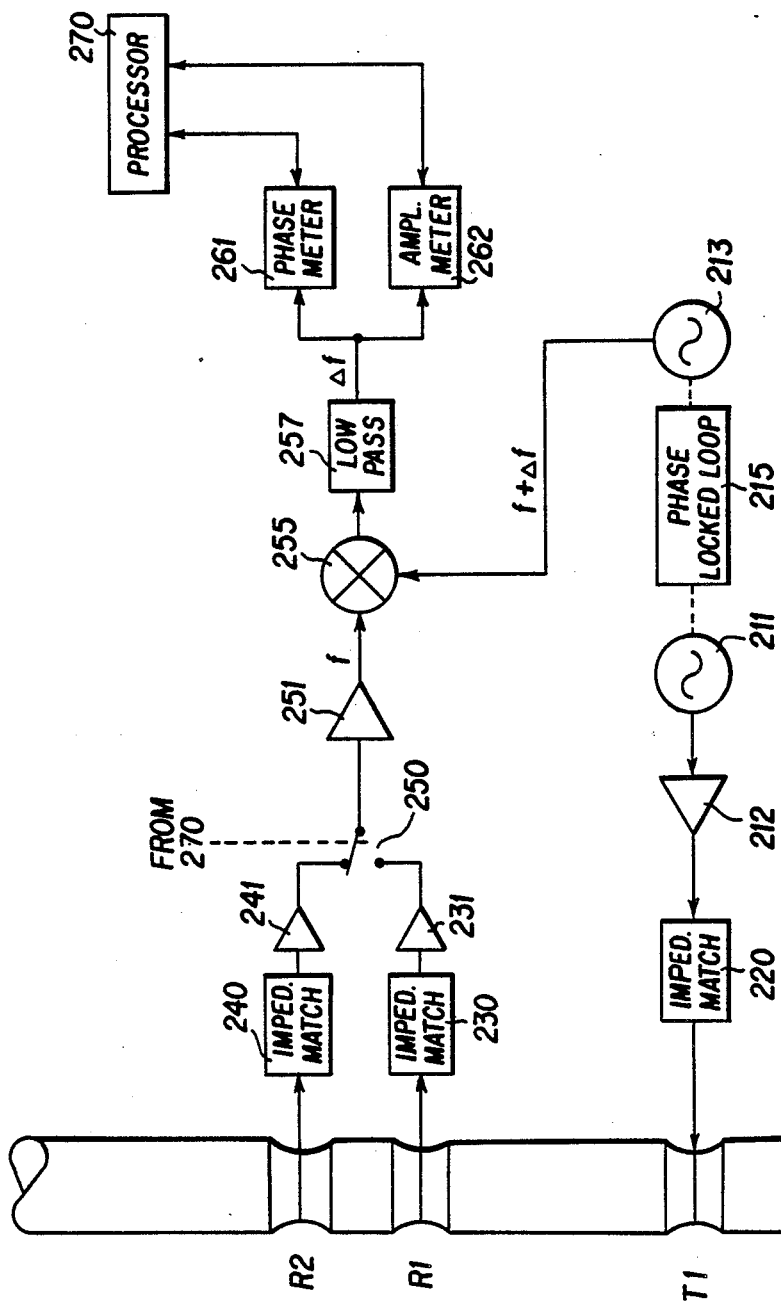
FIG. 2 is a diagram, partially in block form, of the electronics in the measuring apparatus and the acquisition and processor electronics of the FIG. 1 embodiment.

FIG. 2 is a block diagram of electronics in the measuring apparatus 200 and the acquisition and processor electronics 58. An oscillator 211 produces an electrical signal of frequency f, which is amplified by amplifier 212 and applied to the transmitting antenna T1, via impedance matching 220. The signal from receiver R1 is coupled via impedance matching circuit 230 and preamplifier 231 to one input of an electronically controlled switch 250. Similarly, the signal from receiver R2 is coupled via impedance matching circuit 240 and preamplifier 241 to the other input of the switch 250. The switch 250, under control of processor 270, selects the near (R1) or the far (R2) receiver output. The selected signal is amplified by amplifier 251 and subsequentally translated to a lower frequency Δf using a known heterodyne technique. A local oscillator is in a phase locked loop (represented at 215) with the master oscillator. The local oscillator 213 has a frequency f+Δf, where Δf is typically a few kilohertz or less. A signal from the local oscillator is mixed with the received signal by a mixer 255, and the mixer output is passed through a low pass filter 257 which blocks signals at f and f+Δf and passes the signal at Δf. The signal at frequency Δf contains the phase and amplitude information of the original signal at frequency f. The recognized advantage of this frequency translation is that it is easier to measure the phase and amplitude at kilohertz or lower frequencies than at megahertz frequencies. The signal at frequency Δf is measured with a phase meter 261 and with an amplitude meter 262, and the results are input to the processor 270. The phase meter 261 may utilize a reference signal from the phase locked loop 215. The phase and amplitude meters may also include sample-and-hold circuits, to implement comparison of the signal from the respective receivers. In this regard, reference can be made, for example, to U.S. Pat. No. 4,185,238, assigned to the same assignee as the present application. Alternatively, the processor may compute the relative phase and amplitude from the measurements it receives.

As noted above, the processor 270 has associated memory clocking, and interface circuitry (not shown), as is conventional. The processor implements storage of the measurements of phase and amplitude, processing of these measurements in the manner to be described, storage of the results of the processing, and/or coupling of the measurements and/or processing results to the control and driving electronics for transmission to the earth's surface. In the present embodiment, a downhole clock is utilized to keep track of time, which can subsequently be correlated with depth level by virtue of keeping a record of the drill string progress. The clock, which can typically be part of the system in conjunction with the processor 270, can be synchronized with the system before a trip downhole. Also, if desired, communication with the downhole system, using mud pulse technology or other suitable communication means, can be utilized to convey timing synchronization and/or depth level information, as well as to communicate data in general. It will be understood that the invention can be utilized in conjunction with any suitable technique for keeping track of depth level.

Figure 3:
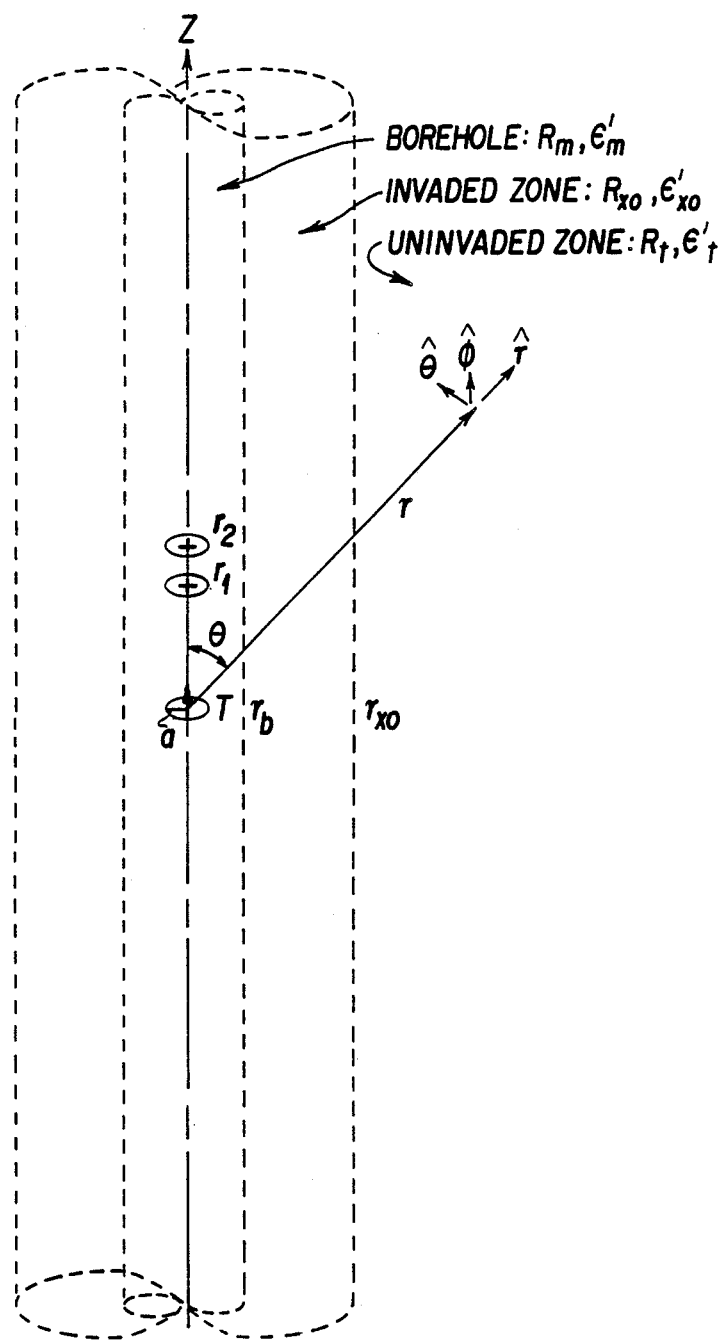
FIG. 3 is a model of the FIG. 1 antennas in a borehole in earth formations.

Consider the FIG. 3 model of the FIG. 1 antenna system. For simplicity, the drill collar is not included in this model. The drill collar can be taken into account, but this requires a more sophisticated mathematical analysis, which produces the same general conclusions as can be obtained from the simpler model. The transmitter (T) is a coil with N turns, with radius "a", with the coil axis aligned in the z direction, and carrying an energizing current "I". The receivers are N turn coils with similar radii, aligned in the z direction, and located distances of $r_1$ and $r_2$ from the transmitter.

In spherical coordinates, for $r \gg a$, the electric field radiated by the transmitter in a homogeneous medium is given by $$E_\phi(r,\theta) = \frac{N\pi a^2 I k \omega}{2\pi c r} \sqrt{\frac{\mu_0}{\epsilon_0}} \left(1 + \frac{j}{kr}\right) \sin\theta e^{j(kr-\omega t)}. \quad (1)$$

where the point of observation is (r, θ, φ). This equation is identical to that for a vertical magnetic dipole located at the transmitter. The propagation constant, k, is given by $$k = \frac{\omega}{c} \sqrt{\epsilon' + j\frac{\sigma}{\epsilon_0 \omega}}, \quad (2)$$

where ω is the angular frequency, c is the speed of light in vacuum, $\epsilon_0$ is the permittivity of vacuum, $\mu_0$ is the magnetic permeability of vacuum, $\epsilon'$ is the relative permittivity or dielectric constant of the formation, and σ is the conductivity of the formation. The conductivity (σ) is the inverse of the resistivity (R), namely σ=1/R.

The signal measured at the near receiver ($S_1$) is proportional to $E_\phi(r_1, \theta_1)$ and the signal measured at the far receiver ($S_2$) is proportional to $E_\phi(r_2, \theta_2)$, where $\theta_1 = \text{ARCTAN}(a/r_1)$ and $\theta_2 = \text{ARCTAN}(a/r_2)$. Let the amplitude and phase of the signal at the near receiver be denoted as $|S_1|$ and $\Phi_1$, and the amplitude and phase of the signal at the far receiver be denoted as $|S_2|$ and $\Phi_2$, $$S_1 = |S_1| e^{j\Phi_1 \pi/180}, \quad S_2 = |S_2| e^{j\Phi_2 \pi/180}. \tag{3}$$

The complex ratio of the far receiver's signal to the near receiver's signal is given by $$\frac{S_2}{S_1} = \frac{r_1}{r_2} \frac{1 + \frac{j}{kr_2}}{1 + \frac{j}{kr_1}} e^{jk(r_2 - r_1)}. \tag{4}$$

The phase shift ($\Phi$) and attenuation (A) between the two receiving antennas are related to the signal ratio by $$\frac{S_2}{S_1} = 10^{A/20} e^{j\Phi\pi/180}, \tag{5a}$$

or $$\Phi = \Phi_2 - \Phi_1 = \frac{180}{\pi} \text{Imag}(\ln(S_2/S_1)) \tag{5b}$$

and $$A = 20 \log_{10}(|S_2|/|S_1|). \tag{5c}$$

Figure 4:
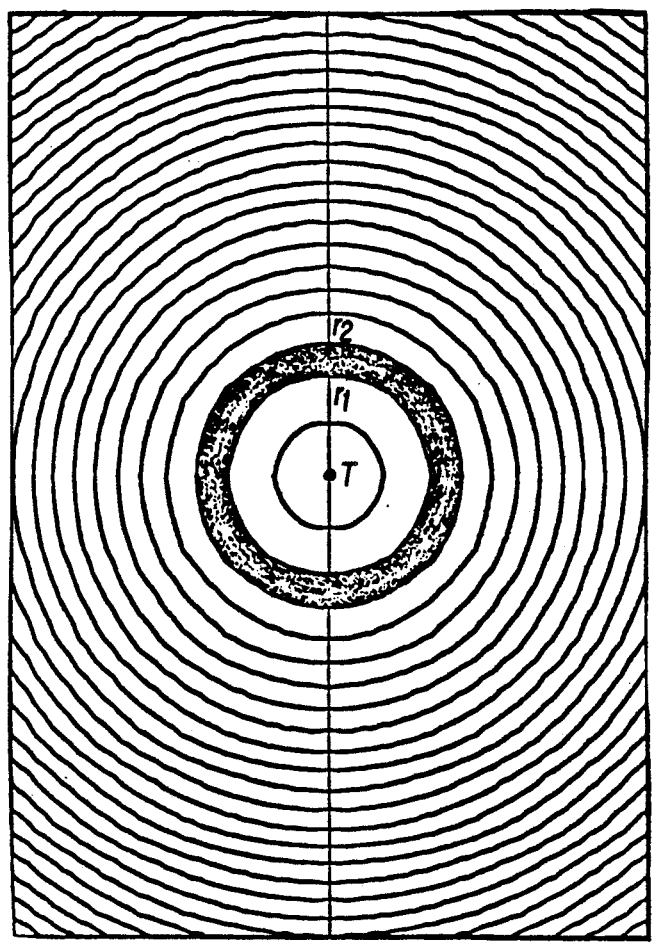
FIG. 4 is a graph of lines of constant phase around a transmitter.
Figure 5:
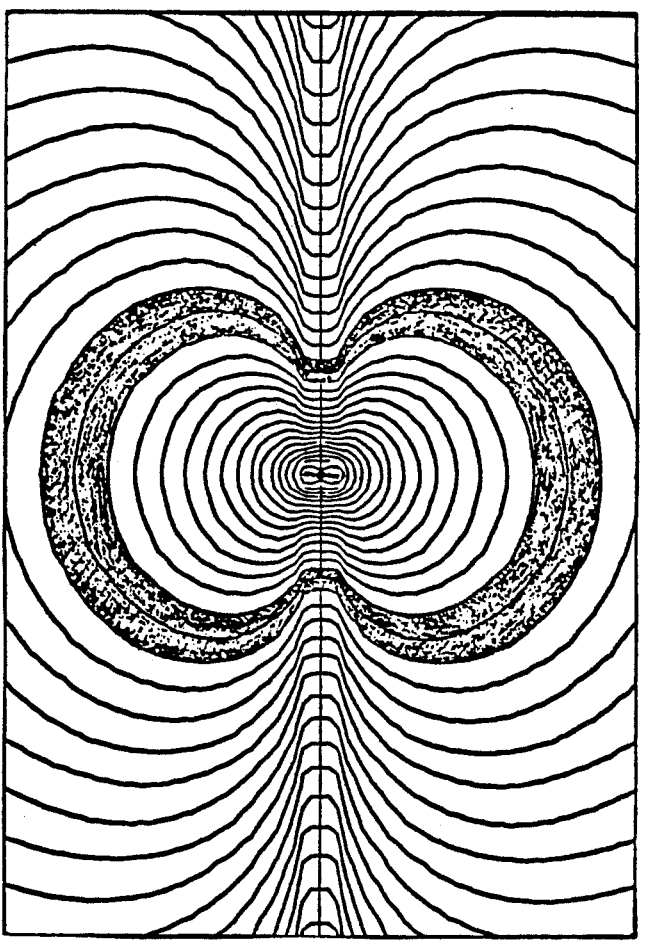
FIG. 5 is a graph of lines of constant amplitude around a transmitter.

FIGS. 4 and 5 illustrate, in simplified form, the general nature of the amplitude and phase measurements, at the frequency range of interest herein, and are useful in understanding relative depths of investigation attributable to amplitude and phase measurements of signals transmitted from the same location in the same formations. FIG. 4 shows, in simplified terms and ignoring geometric effects for clarity of illustration, the general shape of lines of constant phase of electromagnetic wave energy which would result from a vertical magnetic dipole source located at the position of transmitter T. The lines of constant phase are generally circular in shape and indicate, for example, that the phase difference as between signals received at positions designated $r_1$ and $r_2$ in the borehole is related to the phase difference attributable to the formations between the inner and outer lines of the shaded region (at positions corresponding to the receiver locations). In FIG. 5, lines of constant amplitude are shown (neglecting geometrical effects for clarity of illustration). The difference in amplitude as between the positions of $r_1$ and $r_2$ (not shown, the scale being the same as in FIG. 4) corresponds to the difference in amplitude attributable to formations lying between the inner and outer lines of the shaded regions. In both cases, the differential nature of the comparison of the signals tends to cancel the effect of the unshaded regions.

It is seen from the diagrams of FIGS. 4 and 5 that the lines of constant phase are nearly circular and are concentric with the transmitter. The lines of constant amplitude are not circular, but project farther in the radial direction than in the vertical direction. The attenuation measured between the two receivers is seen to be characteristic of a significantly deeper radial zone than is the phase shift measured between the two receivers. This illustration uses magnetic dipole theory for a homogeneous medium, but models which take into account the effect of the drill collar, borehole, etc. produce the same result; namely, attenuation provides a deeper radial depth of investigation than does phase shift. Regarding this phenomenon, reference can also be made to the U.S. Pat. No. 4,209,747, which is referred to in the Background portion hereof.

Figure 6:
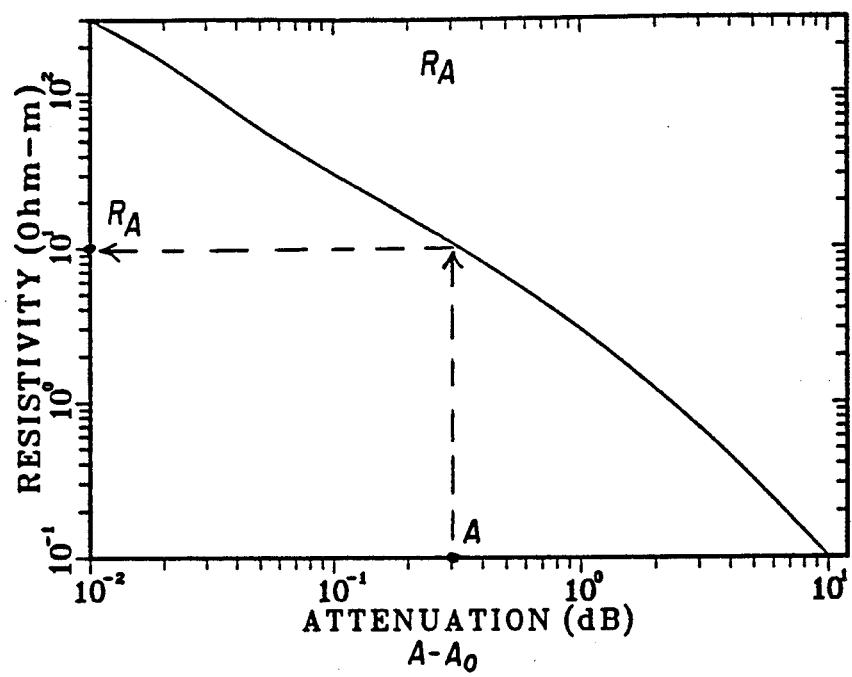
FIG. 6 shows a graph representative of a look-up table for obtaining apparent resistivity from an attenuation measurement.
Figure 7:
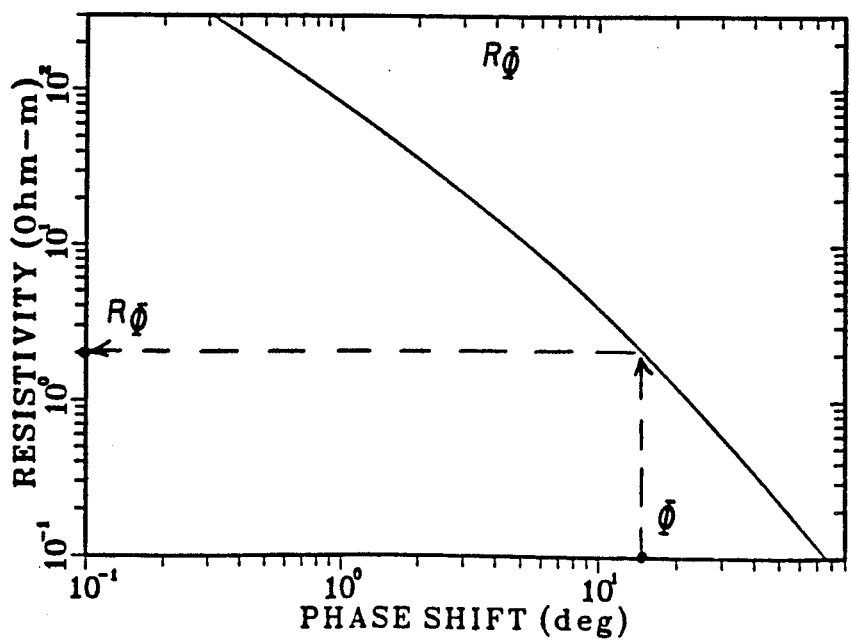
FIG. 7 shows a graph representative of a look-up table for obtaining apparent resistivity from a phase shift measurement.

FIGS. 6 and 7 show graphs representative of look-up tables calculated for a specific embodiment of the invention, wherein the transmitter and two receivers are part of a 6.5 inch diameter drill collar and have vertical spacings of $r_1 = 25$ and $r_2 = 31$ inches, and the transmitter broadcasts an electromagnetic wave with a frequency of 2 MHz. The phase shift ($\Phi$) and the attenuation (A) are measured between the two receivers as described by relationships (5b) and (5c).

Figure 8:
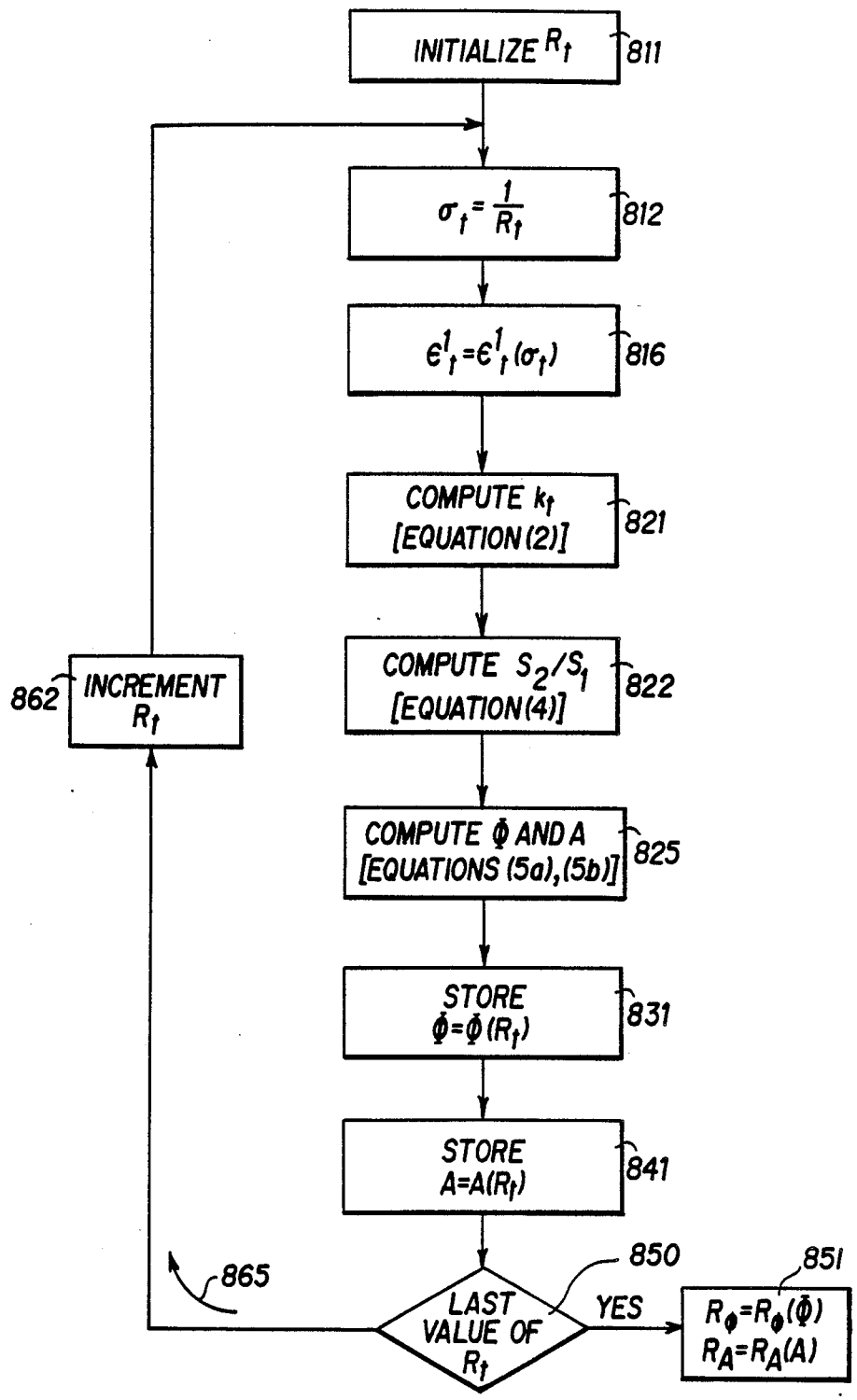
FIG. 8 is a flow diagram of the routine for obtaining look-up tables which store values of apparent resistivity as a function of measured phase shift, and as a function of measured attentuation.

The look-up tables can be obtained using the relationships (2), (4), (5b) and (5c) above. FIG. 8, described below, is a flow diagram of a routine for the processor for obtaining and storing the values of $R_\phi$ and $R_A$ associated with measured values of phase shift and attenuation, respectively. In operation, when values of $\Phi$ and A are input to the processor 270 [or, if desired, an uphole processor, e.g. 85 in FIG. 1], the appropriate values of apparent resistivity can be obtained using the stored table of values. The routine for control of the processor to implement this function is described below in conjunction with FIG. 9. The tables of values obtained can alternatively be utilized in graphical form. In particular, the curves of FIGS. 6 and 7 are obtained by plotting the tabulated values. To use the curve of FIG. 6, the measured attenuation (A), minus the attenuation due to geometrical spreading loss, can be entered on the horizontal axis of the plot, and the apparent resistivity from attenuation (i.e., $R_A$) can be determined. In FIG. 7, the measured phase shift ($\Phi$) can be entered on the horizontal axis of the $R_\phi$ plot, and the apparent resistivity from the phase shift ($R_\phi$) can be determined. The conversion from phase shift and attenuation to apparent resistivities could also be accomplished by using polynomial functions whose coefficients are chosen to provide an accurate representation of the tabulated values.

If there is no invasion by borehole fluid, then the two values for apparent resistivity can be expected to coincide. In the case of invasion, the apparent resistivity from attenuation, which provides a deeper radial depth of investigation than the apparent resistivity derived from the phase shift, will generally give a different measurement value.

Referring to FIG. 8, there is shown a flow diagram of a routine with which a processor can be programmed (typically, before operation) to obtain and store the look-up table for obtaining an apparent resistivity from the phase measurement, and for obtaining an apparent resistivity from the attenuation measurement. The value of true resistivity, $R_t$, is initialized at one end of the range the table is to cover, as represented by the block 811. The corresponding conductivity is then obtained, as represented by the block 812. Also, there is computed, as a function of the present value of conductivity (or resistivity), an assumed value of dielectric permittivity, $\epsilon_t'$. As described further hereinbelow, depending upon the frequency of operation and the conductivity of the formations being investigated, the dielectric permittivity may have a substantial effect upon the measurements, particularly at relatively high resistivity. However, an assumed dielectric permittivity can be obtained with reasonable accuracy as a function of conductivity, and then utilized to obtain a more accurate measurement. This may be done by using a look-up table which assigns a value of dielectric permittivity as a function of conductivity, as represented by the block 816 in FIG. 8. The block 821 is next entered, this block representing the computation of the propagation constant, $k_t$, in accordance with relationship (2). The expected signal ratio at the receivers, $S_2/S_1$, can then be obtained, as represented by relationship (4), and as indicated by block 822. Next, the expected phase shift, $\Phi$, and the expected attenuation, A, can be computed in accordance with relationships (5b) and (5c) [block 825]. The computed value of $\Phi$ is then stored in the table in conjunction with the current value of $R_t$, as represented by the block 831. Similarly, the computed value of attenuation, A, is stored in conjunction with the current value of $R_t$, as represented by the block 841. Inquiry is then made (diamond 850) as to whether or not the last value in the range or $R_t$ has been considered. If not, $R_t$ is incremented (block 862), and the loop 865 is continued until the look-up tables are complete. When the last value for $R_t$ has been considered, the tables represented by blocks 831 and 841 are converted (block 851) to give apparent resistivities as functions of $\Phi$ and A. For example, $R_t$ is the independent quantity and $\Phi$ is the dependent quantity in the table represented by block 831. The look-up table in block 851 has $R_t$ being replaced by $R_\phi$, with $\Phi$ being treated as the independent quantity and $R_\phi$ as the dependent quantity. The look-up table for the attenuation is obtained in a similar manner.

Figure 9:
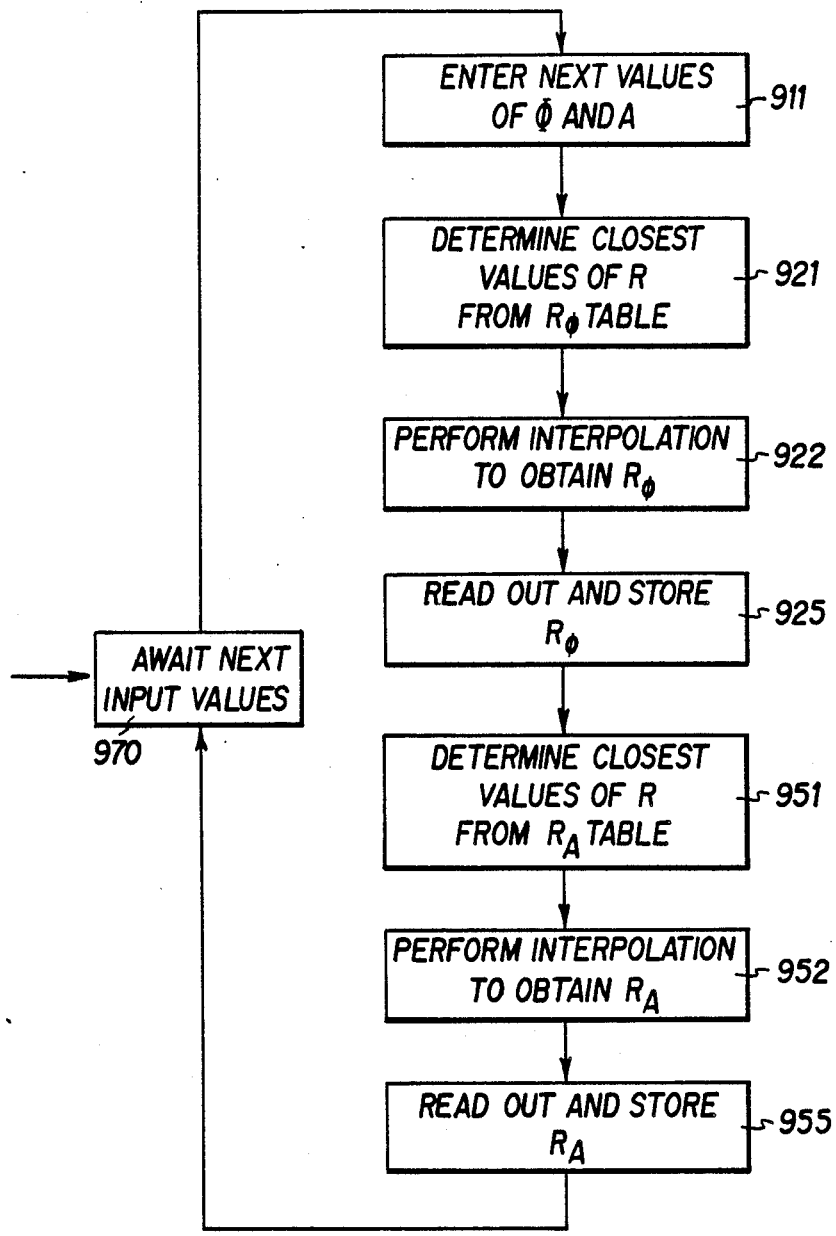
FIG. 9 is a flow diagram of the routine for utilizing look-up tables to obtain apparent resistivity from measured phase shift and from measured attenuation.

Referring to FIG. 9, there is shown the routine for the processor 270 (or uphole processor 85, if desired) for obtaining an apparent resistivity from the measured phase shift and attenuation. Two values of apparent resistivity are obtained; namely, an apparent resistivity $R_A$ which is obtained from the attenuation measurement and is a relatively deep measurement, and an apparent resistivity $R_\phi$ which is obtained from the phase measurement and is a relatively shallow measurement. The block 911 represents the entering of the next values of $\Phi$ and A from which apparent resistivity is to be determined. The closest values of R are then obtained from the $R_\phi$ look-up table (block 921), and an interpolation is performed to obtain $R_\phi$ (block 922). This value of $R_\phi$ is then read out and stored, as represented by the block 925. Similarly, the closest values of resistivity are obtained from the $R_A$ table (block 951), an interpolation is performed on same (block 952), and the determined value of $R_A$ is read out and stored (block 955). The next values of phase and attenuation are then awaited, as represented by the block 970, and when they are received, the block 911 is reentered for obtaining and storaging of further apparent resistivity values.

Figure 10:
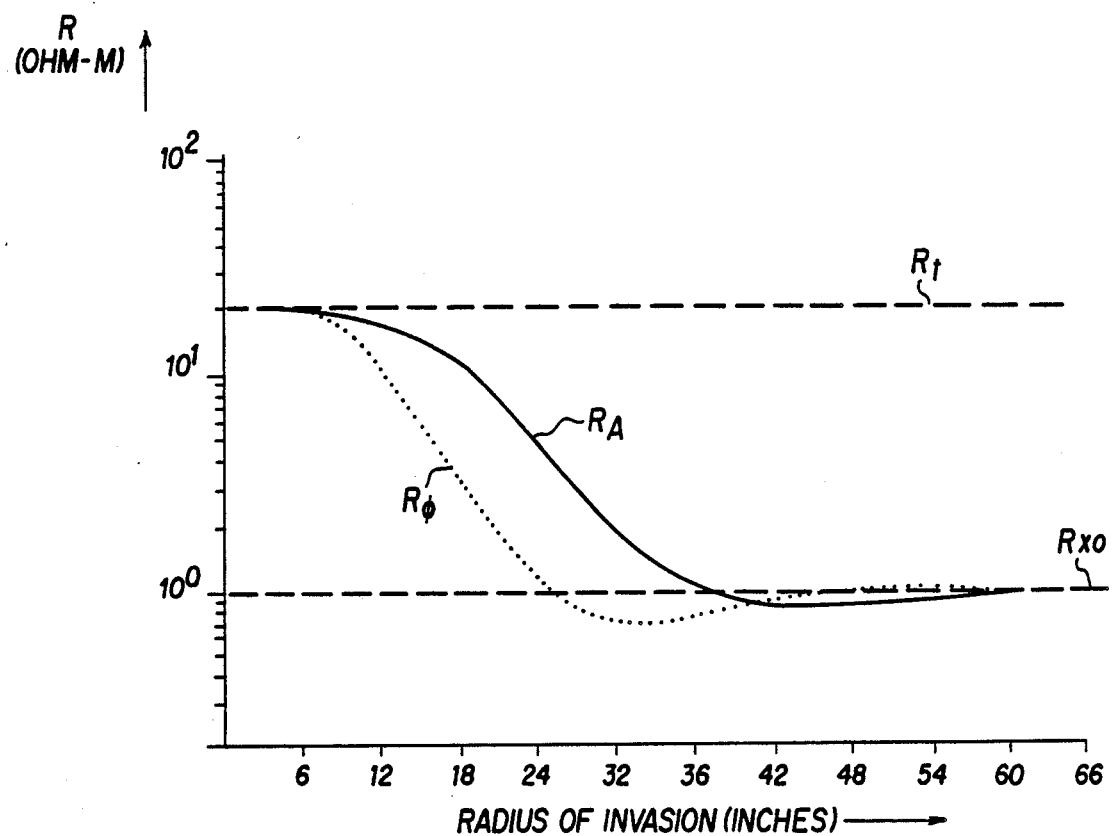
FIG. 10 is a graph which illustrates the apparent resistivities, as a function of radius of invasion, for a particular example.

Examples can be presented to illustrate the dual radial depths of investigation provided by the phase shift and attenuation measurements. Referring again to the model of FIG. 3, an invaded zone of radius $r_{xo}$, resistivity $R_{xo}$, and dielectric constant $\epsilon'_{xo}$ was shown. The virgin formation resistivity is $R_t$ and dielectric constant is $\epsilon'_t$. FIG. 10 shows the apparent resistivities derived from phase shift and from attenuation for a typical situation where a saline water based mud progressively invades a porous formation which contains hydrocarbons. The virgin formation has a resistivity ($R_t$) of 20 ohm-m, and the invaded zone resistivity $R_{xo}$ is 1 ohm-m. The two apparent resistivities, $R_A$ and $R_\phi$, are plotted as a function of radius of invasion. When there is no invasion, both apparent resistivities read 20 ohm-m. With the radius of invasion between 6 and 36 inches, $R_A$ consistently reads closer to $R_t$ than does $R_\phi$. Hence, the apparent resistivity from the attenuation measurement provides a deeper radial depth of investigation than does the apparent resistivity from the phase shift measurement.

Figure 11:
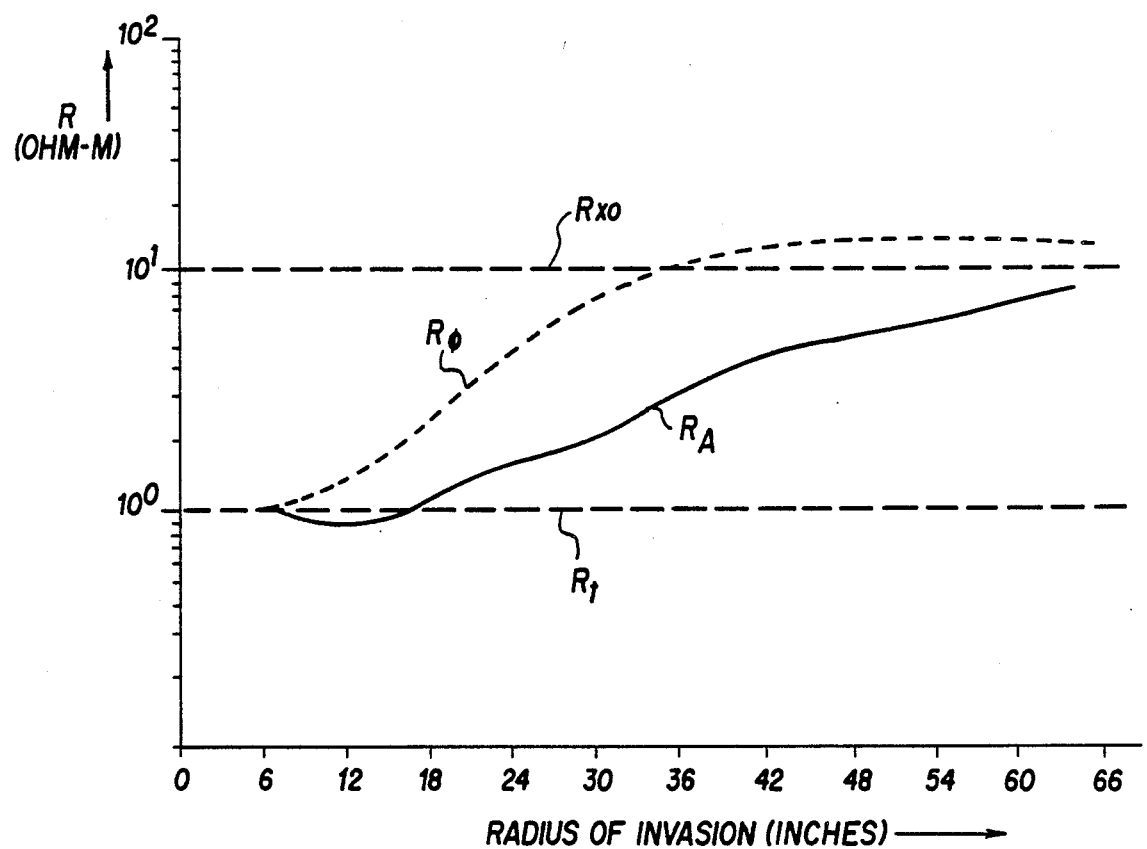
FIG. 11 is a graph which illustrates the apparent resistivities, as a function of radius of invasion, for another example.

FIG. 11 shows another typical situation, which occurs when an oil based mud invades a porous formation which initially contains water, but not hydrocarbons. In this example, the oil in the borehole displaces formation water causing the invaded zone resistivity to increase to 10 ohm-m, while the virgin formation has a resistivity of 1 ohm-m. With the radius of invasion being between 6 and 60 inches, $R_A$ consistently reads closer to $R_t$ than does $R_\phi$. Again, the apparent resistivity from attenuation provides a deeper radial depth of investigation than that from the phase shift.

In the first example (FIG. 10), a potential hydrocarbon bearing formation might be missed without the two radial depths of investigation. In the second example (FIG. 11), a water bearing formation might be mistaken as a hydrocarbon bearing formation without the two radial depths of investigation. It is well known in the art of well logging interpretation that two radial depths of investigation can be used to identify the occurrence of invasion, and that the deeper resistivity reading can be corrected using the shallower resistivity reading to obtain a better estimate of $R_t$ than given by a single reading. In the present invention, this is achieved with a single receiver pair.

In accordance with a feature hereof, in obtaining true resistivity from the measured phase shift and from the measured attenuation, the dielectric constant is treated as a function of conductivity, and is not treated as an independent quantity. This is taken into account in formulating the look-up tables, as represented by block 816 of FIG. 8. For typical formations encountered in oil well logging, and for frequencies less than 10 MHz, conduction currents dominate displacement currents, so the dielectric constant does not have a large effect on electromagnetic wave propagation. Hence, treating the dielectric constant as a dependent quantity does not introduce a significant error in the resistivity measurements if a suitable function is utilized.

Figure 12:
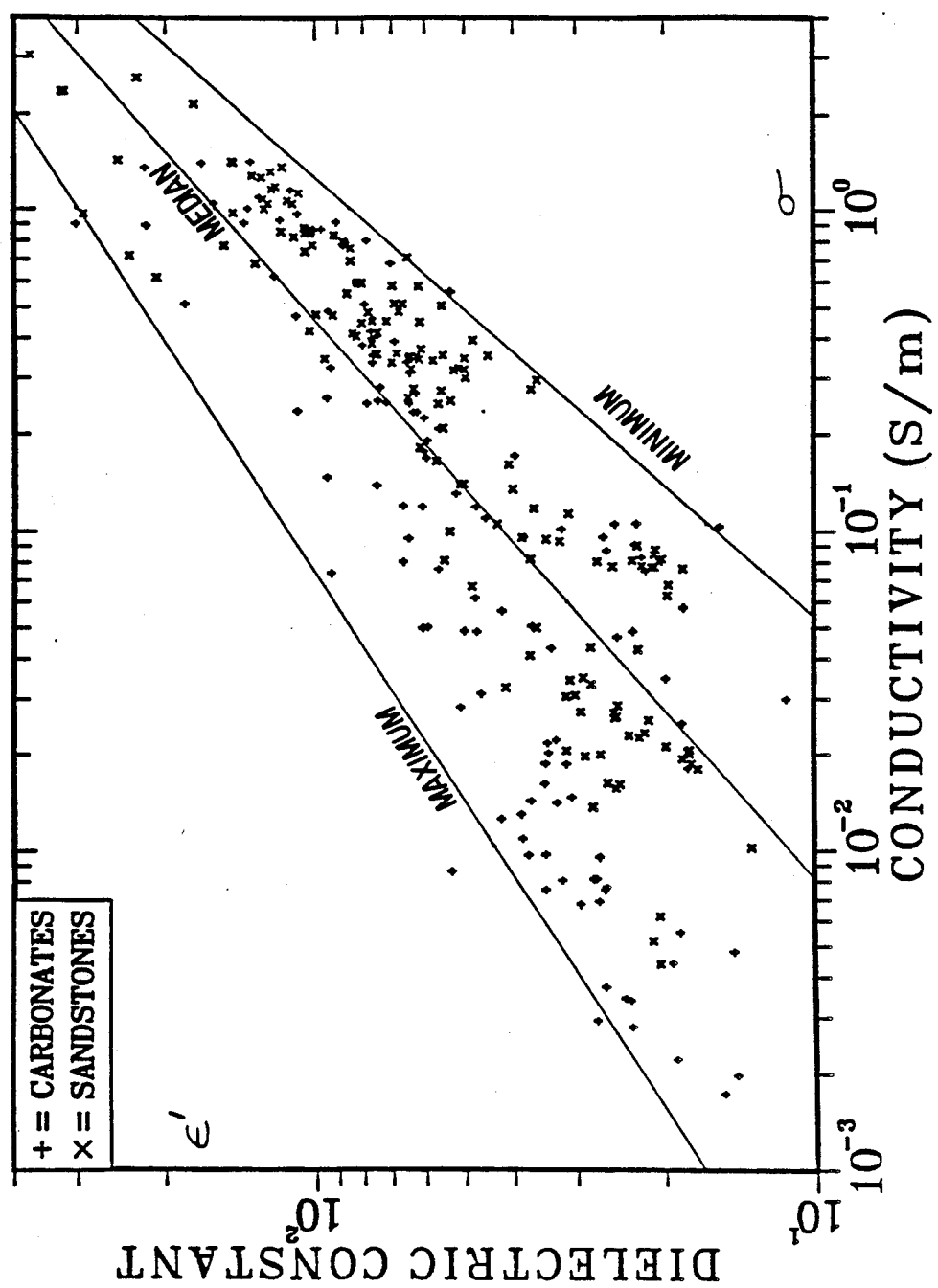
FIG. 12 is a graph showing the dielectric constant as a function of conductivity for water-saturated rock samples taken from a number of different locations.

For example, consider an operating frequency of 2 MHz. FIG. 12 represents data for numerous water-saturated rock samples taken from oil wells around the world. The measured value for dielectric constant, $\epsilon'$, is cross plotted versus conductivity, $\sigma$, for each sample. For any given value of conductivity, there are approximate minimum, maximum, and medium values for dielectric constant in this data. FIG. 13 is a table which lists the minimum and maximum values for the dielectric constant for some specific values of conductivity. In this table, for each conductivity, the minimum and maximum values for $\epsilon'$ are used to calculate a propagation constant k. The percent variations in the real (k') and imaginary (k'') parts of k are small for conductivities above 0.01 S/m (resistivities below 100 ohm-m). Thus, the dielectric constant does not have a major effect on the propagation constant for resistivities less than about 100 ohm-m for this set of rock samples at 2 MHz. An average value for the dielectric constant as a function of conductivity is indicated by the middle curve in FIG. 12. This can be used for the function $\epsilon'(\sigma)$ (e.g. in block 816 of FIG. 8). In this case, the error in the propagation constant will be less than 11% for resistivities less than 100 ohm-m.

It will be understood that the function chosen for $\epsilon'(\sigma)$ can be tailored for particular types of rocks or for particular locations in the world. For example, different functions could be chosen for sandstones and carbonates.

Figure 14:
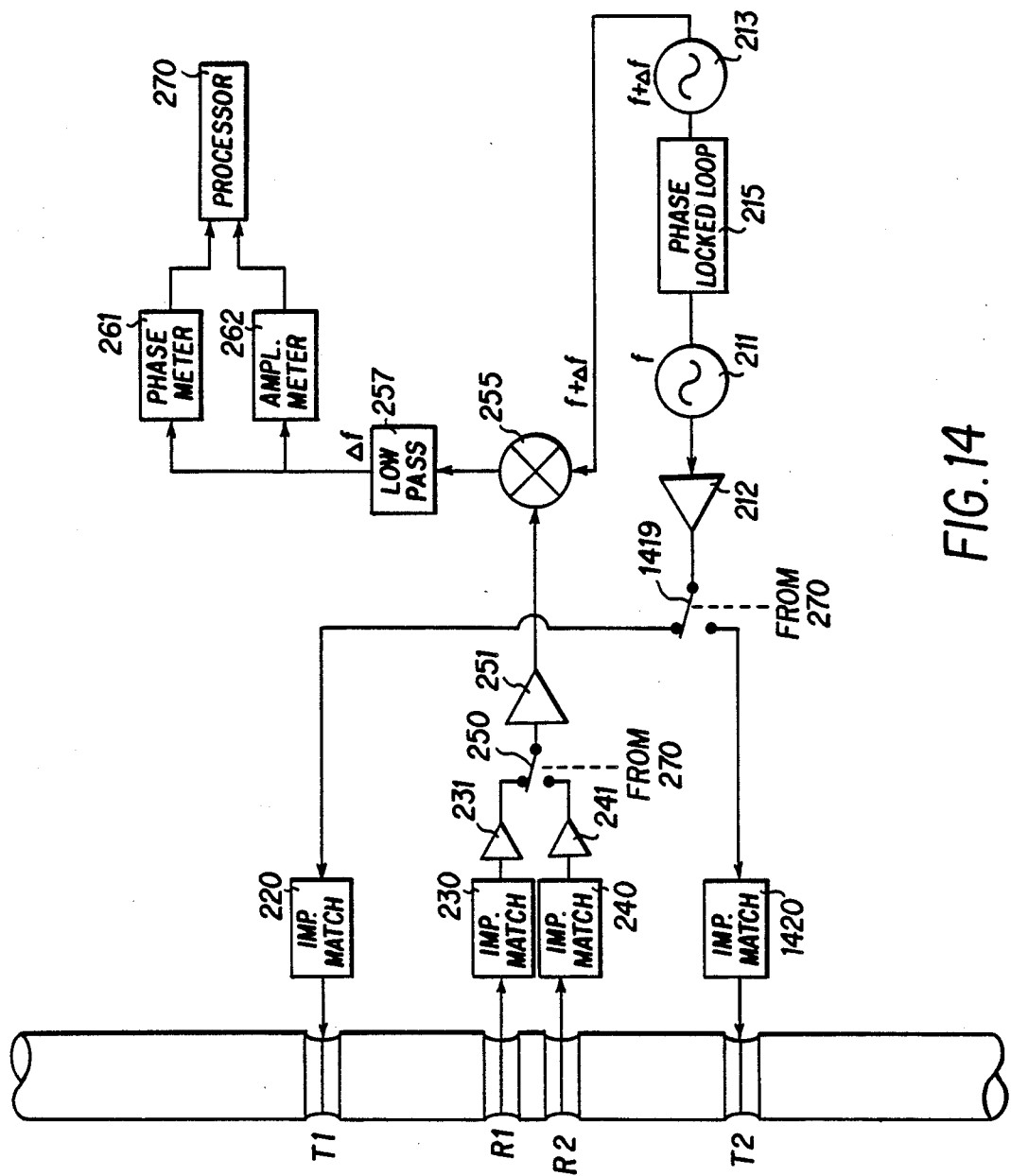
FIG. 14 is a diagram, partially in block form, of an embodiment of an apparatus in accordance with a further form of the invention, and which can be used to practice a further form of the method of the invention.

Referring to FIG. 14, there is shown an embodiment of a further form of the invention which utilizes a second transmitter, T2, on the other side of the receivers R1 and R2. This arrangement can be utilized to obtain, inter alia, so-called "borehole-compensated" operation; i.e., operation which minimizes the effect on the measurement of the borehole. Borehole compensation with two alternately operating transmitters has been employed in other types of logging but, to Applicant's knowledge, has not previously been used or proposed for use in a transverse electric electromagnetic propagation logging device other than a pad-type device. Some of the reasons for this were discussed hereinabove. In the embodiment of FIG. 14, a single pair of receivers can be utilized to obtain different depths of investigation, and provision is made, as will be further described, for protecting the receiver signals against noise (particularly noise resulting from crosstalk between the wires of at least the one transmitter cable which must pass the receiver locations in a borehole-compensated arrangement).

The components in FIG. 14 which have like reference numerals to those of the FIG. 2 embodiment generally correspond in function and operation to those elements. In FIG. 14, the transmitter T1 is the uphole transmitter and the transmitter T2 is the downhole transmitter, and receiver R1 is the receiver closer to T1. The transmitters are energized via oscillator 211 amplifier 212, switch 1419, and impedance matching circuits 220 (for T1) and 1420 (for T2). The switch 1419 is under control of processor 270 to alternate between energizing of T1 and of T2. In borehole compensated operation, the phase shift information obtained during transmission by T1 and the phase shift information obtained during transmission by T2 are averaged, and the attenuation obtained during transmission by T1 and the attenuation obtained during transmission by T2 are averaged. The switch 1419 can be operated at any suitable frequency, for example in the range 10 to 100 Hz. The averaging can be performed by processor 270. [Reference can also be made to U.S. Pat. No. 3,849,721, assigned to the same assignee as the present invention, for a hardware implementation of circuitry for averaging signals in a borehole compensated system.] The effects of using borehole compensation herein are treated further hereinbelow, beginning with the description of FIG. 21.

Figure 15A:
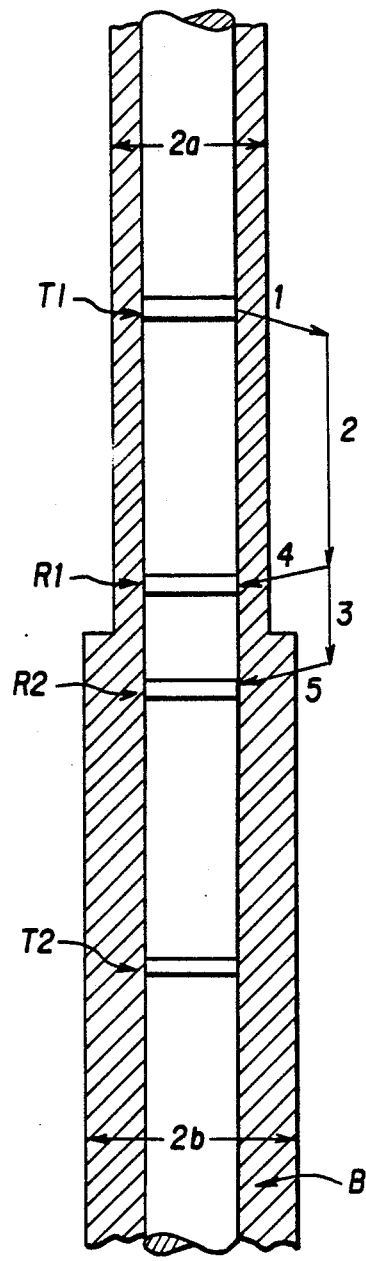
FIGS. 15A and 15B, show simplified ray diagrams which are useful in understanding the FIG. 14 embodiment and its use as a differential caliper.

In accordance with a further feature of the invention, there is provided an electronic borehole caliper capability with can utilize signals obtained with the FIG. 14 embodiment. An explanation of this feature of the invention is set forth in terms of the diagrams of FIGS. 15A and 15B. In FIG. 15A the uphole transmitter is broadcasting, and the downhole transmitter is off. The borehole diameter is assumed to change, in this example, from 2a at R1 to 2b at R2. The phases and amplitudes of the signals at R1 and R2 are designated $\Phi_{1d}$, $|S_{1d}|$, and $\Phi_{2d}$, $|S_{2d}|$, respectively. From (5b) and (5c) above, the phase shift and the attenuation of the downwardly propagating wave are $$\Phi_d = \Phi_{2d} - \Phi_{1d}, \tag{6}$$

and $$A_d = 20\log_{10}(|S_{2d}/S_{1d}|). \tag{7}$$

Figure 15B:
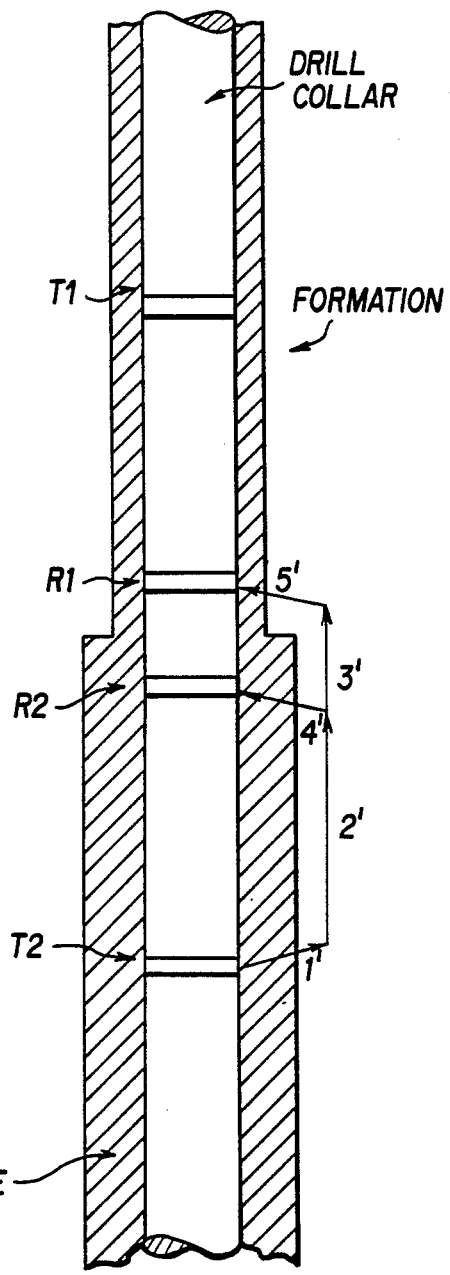

Refer now to FIG. 15B, wherein the downhole transmitter is assumed to be broadcasting, and the uphole transmitter is assumed to be off. The phases and amplitudes of the signals at R1 and R2 for this case are $\Phi_{1u}$, $|S_{1u}|$, and $\Phi_{2u}$, $|S_{2u}|$, respectively. The phase shift and the attenuation of the upwardly propagating wave are $$\Phi_u = \Phi_{1u} - \Phi_{2u}, \tag{8}$$

and $$A_u = 20\log_{10}(|S_{1u}/S_{2u}|). \tag{9}$$

The phase shift imbalance ($\Phi_I$) and the attenuation imbalance ($A_I$) are therefore $$\Phi_I = \Phi_u - \Phi_d, \tag{10}$$

and $$A_I = A_u - A_d. \tag{11}$$

The phase shift imbalance and the amplitude imbalance depend on $2(b-a)$, the change in borehole diameter between R1 and R2. This can be shown using a "lateral wave" model for the wave propagation paths to illustrate the principle, it being understood that a more sophisticated mathematical analysis can be employed. The ray paths for downward propagation are indicated by arrows 1 through 5 in FIG. 15A. The ray paths for upward propagation are indicated by arrows 1' through 5' in FIG. 15B. $\Phi_d$ is the sum of the phase shifts along paths 3 and 5 minus the phase shift along path 4. Paths 4 and 5 would have identical phase shifts if the borehole diameter was constant, and $\Phi_d$ would be simply be the phase shift along path 3. However, the phase shifts along paths 4 and 5 are different because the distances traveled in the mud and in the formation are different. Similarly, $\Phi_u$ is the sum of the phase shifts along paths 3' and 5' minus the phase shift along path 4'. The phase shifts are equal for paths 4 and 5', for paths 3 and 3', and for paths 5 and 4'. Hence, $\phi_I$ is proportional to the difference in phase shifts between paths 4 and 5, which depends on $2(b-a)$.

The phase shift imbalance, $\Phi_I$, and the attenuation imbalance, $A_I$, can be calculated using the plane wave propagation constants. The propagation constant for the formation [first set forth above as (2)] is $$k_f = \frac{\omega}{c} \sqrt{\epsilon'_f + j\frac{1}{\epsilon_0 \omega R_f}}, \tag{12}$$

where $\omega$ is the angular frequency, c is the speed of light in vacuum, $\epsilon_o$ is the permittivity of vacuum, $\epsilon'_f$ is the dielectric constant of the formation and $R_f$ is the resistivity of the formation. The propagation constant for the mud is $$k_m = \frac{\omega}{c} \sqrt{\epsilon'_m + j\frac{1}{\epsilon_0 \omega R_m}}, \tag{13}$$

where $\epsilon'_m$ is the dielectric constant of the mud and $R_m$ is the resistivity of the mud. The phase shift imbalance and the attenuation imbalance are $$\Phi_I = 2(b-a)\frac{180}{\pi}\text{Real}(k_f - k_m). \quad (14a)$$

$$A_I = 2(b-a)20\log_{10}(e)\text{Imag}(k_f - k_m) \quad (14b)$$

When $k_f$ and $k_m$ are different and known, $\Phi_I$ or $A_I$ can be used to obtain the change in borehole diameter, $2(b-a)$. The incremental change in the borehole diameter computed using the phase shift imbalance is $$\Delta D_\Phi = \frac{\pi}{180\text{Real}(k_f - k_m)}\Phi_I, \quad (15a)$$

and the incremental change in borehole diameter computed using the attenuation imbalance is $$\Delta D_A = A_I/[20\log_{10}(e)\text{Imag}(k_f - k_m)] \quad (15b)$$

If both receivers are above the borehole diameter step shown in FIG. 15A, $\Phi_I$ and $A_I$ are zero. As the receivers move past the step, $\Phi_I$ and $A_I$ versus depth indicates where the borehole diameter changes and the amount it changes. This provides a "differential caliper" which can be used to detect washouts or caves in the borehole, for example.

Figure 16:
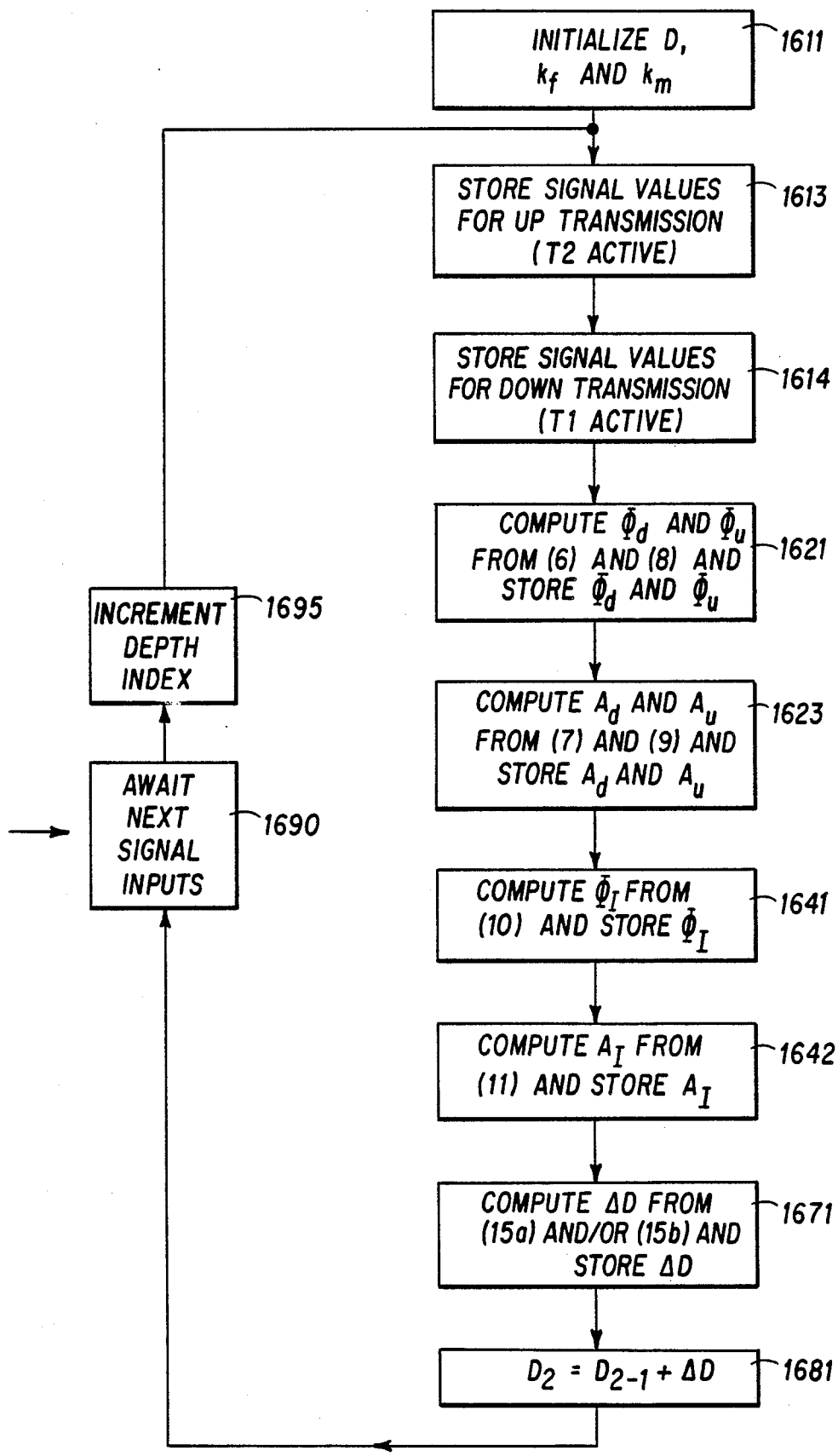
FIG. 16 is a flow diagram of a routine for controlling a processor to obtain the phase imbalance and attenuation imbalance, and to obtain a differential borehole caliper log and a borehole caliper log.

Referring to FIG. 16, there is shown a routine for controlling a processor to obtain the phase imbalance, $\Phi_I$, and/or the attenuation imbalance, $A_I$, and to use the determined imbalance in obtaining a differential borehole caliper and, in some circumstances, a borehole caliper.

The block 1611 represents the initializing of borehole diameter, D. This can be done, when the information is available, to have a baseline from which absolute borehole caliper information can be derived from the differential borehole caliper. If this information is not available, useful differential borehole caliper measurement can still be obtained. The block 1613 is then entered, this block representing the storage of signal values for the "up" transmission; i.e., with transmitter T2 active. The block 1614 is then entered, this block representing the storage of signal values for the "down" transmission; viz., with the transmitter T1 active. Next, using relationships (6) and (8) the values of the phase shift for the "down" transmission, $\Phi_d$, and the value of the phase shift for the "up" transmission, $\Phi_u$, can be obtained. This is represented by the block 1621. The "down" direction attenuation, $A_d$, and the "up" direction attenuation, $A_u$, are then obtained in accordance with relationships (7) and (9), respectively, and these values are stored, as represented by the block 1623. The phase shift imbalance, $\Phi_I$, can now be computed, using relationship (10), and stored, as represented by the block 1641. Next, the attenuation imbalance, $A_I$, can be computed in accordance with relationship (11) and stored, as represented by the block 1642. The change in borehole diameter $\Delta D$, can then be obtained from the phase shift imbalance or the attenuation imbalance, and stored, as represented by the block 1671. The change in diameter, $\Delta D$, is then added to the diameter at the previous depth level, designated as $D_{z-1}$, to obtain the diameter and the current depth level, $D_z$. This is represented by the block 1681. The block 1690 is then entered, this block representing the awaiting of the next set of signal values. A depth (or time) index is then incremented (block 1695), and the block 1613 is then reentered to continue processing. It will be understood that, if desired, the phase shift imbalance can be utilized for measurement of a shallow portion of a cave, and the attenuation imbalance for measurement of the deeper portion thereof.

A more sophisticated mathematical model could be used to relate the phase shift imbalance and the amplitude imbalance to the change in borehole diameter. For example, the specific geometry of the tool, the size and shape of the borehole, and the properties of the mud and formation can be included in the mathematical model and in the look-up table. A caliper look-up table can also be generated by performing an experiment, where $\Phi_I$ and $A_I$ are measured as a tool is moved through a borehole with a stepped diameter.

Figure 17:
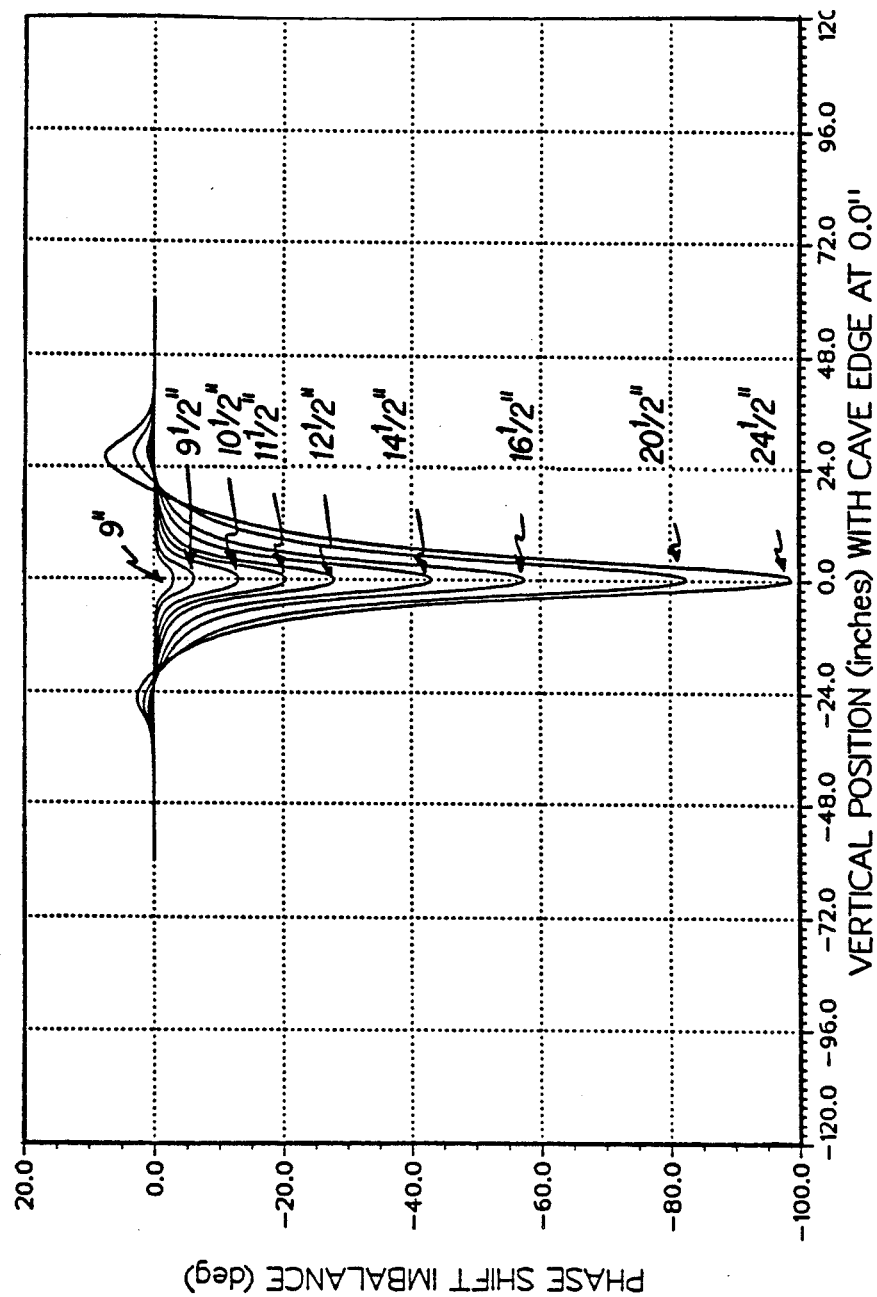
FIG. 17 shows the response of the phase imbalance for an illustrated example.

An illustrative example will now be set forth. Assume that the antennas are on a 6.5 inch diameter drill collar and have the following vertical spacings: $T1-R1=25''$, $R1-R2=6''$, and $R2-T2=25''$. Also assume that the transmitters transmit an electromagnetic wave with a frequency of 2 MHz. FIG. 17, is the calculated response for $\Phi_I$ for the situation depicted in FIGS. 15A and 15B; viz. a step in borehole diameter. The calculation includes the geometry of the tool and the borehole, and the mud and formation resistivities which are assumed to be 0.1 ohm-m and 10 ohm-m, respectively, in this example. The assumed borehole diameter is 8.5'' above the vertical position $z=0''$. Below $z=0''$, the borehole diameter takes on the values of 9'', 9.5'', 10.5'', 11.5'', 12.5'', 14.5'', 16.5'', 20.5'' and 24.5''. The calculated values for $\Phi_I$ are seen to be maximum at $z=0''$ which can be used to locate the cave edge. The calculated maximum values are proportional to the change in borehole diameter.

Figure 18:
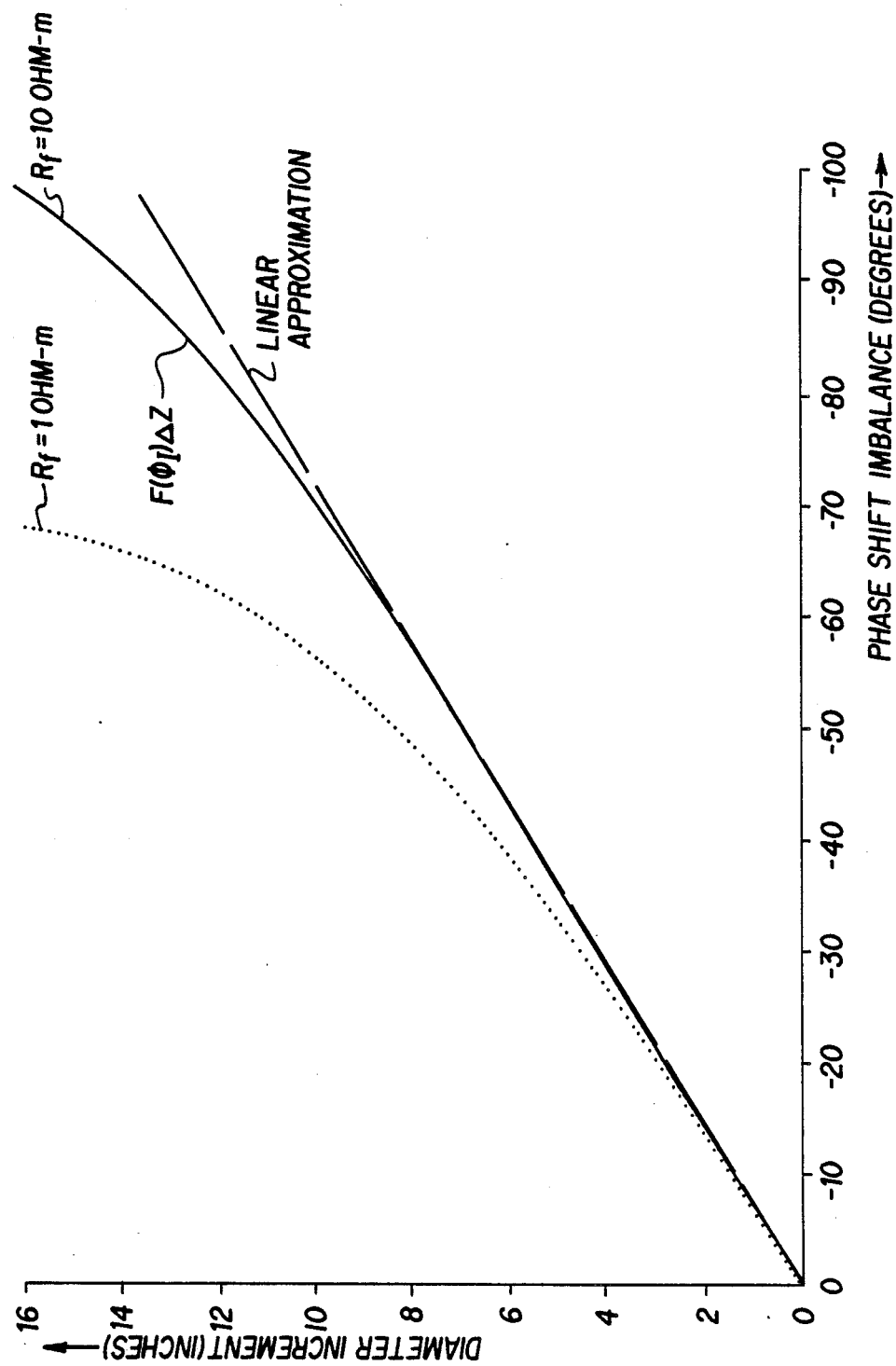
FIG. 18 is a phase caliper graph constructed from the data of FIG. 17.

FIG. 18, is a phase caliper graph constructed from the data plotted in FIG. 17. The solid line shows the change in borehole diameter versus phase shift imbalance at $z=0''$ for $R_m=0.1$ ohm-m and $R_f=10$ ohm-m. For comparison, the dotted line shows the phase caliper graph for $R_m=0.1$ ohm-m and $R_f=1$ ohm-m. The phase caliper graph can also be written as a mathematical function, $$\Delta D_\Phi = F(\Phi_I)\Delta z \quad (16)$$

where $\Delta D_\Phi$ is the increment in diameter, $\Delta z$ is the spacing between the receivers, and $F(\Phi_I)\Delta z$ is the functional representation of the phase caliper table. Typically, $F(\Phi_I)$ has only a weak dependence on $R_f$, but has a strong dependence on $R_m$. Therefore, a table with an appropriate value for $R_m$ is preferred, as $R_m$ is known at the well site. In addition, $R_f$ may also be known from the resistivity measurement described herein.

To obtain a differential caliper, the measured value for $\Phi_I$ can be entered in FIG. 18 (or a look-up table constructed therefrom) and the increment in borehole diameter is read out. For example, suppose the tool begins in an 8.5'' borehole and the value $\Phi_I = -42°$ is measured. This corresponds to a 6'' increase in the borehole diameter. Subsequently, $\Phi_I = 21°$ is measured, which corresponds to a 3'' decrease in the borehole diameter. Starting from a known borehole diameter, the full phase caliper table can be used. However, if the initial borehole diameter is not known, then the table can be approximated by a linear function such as the one shown by the dashed curve in FIG. 18. In this case, the change in borehole diameter is $$\Delta D_\phi = K\Phi_I \quad (17)$$

where K is independent of $\Phi_I$. K is the slope of the dashed line shown in FIG. 18, for example.

Figure 19:
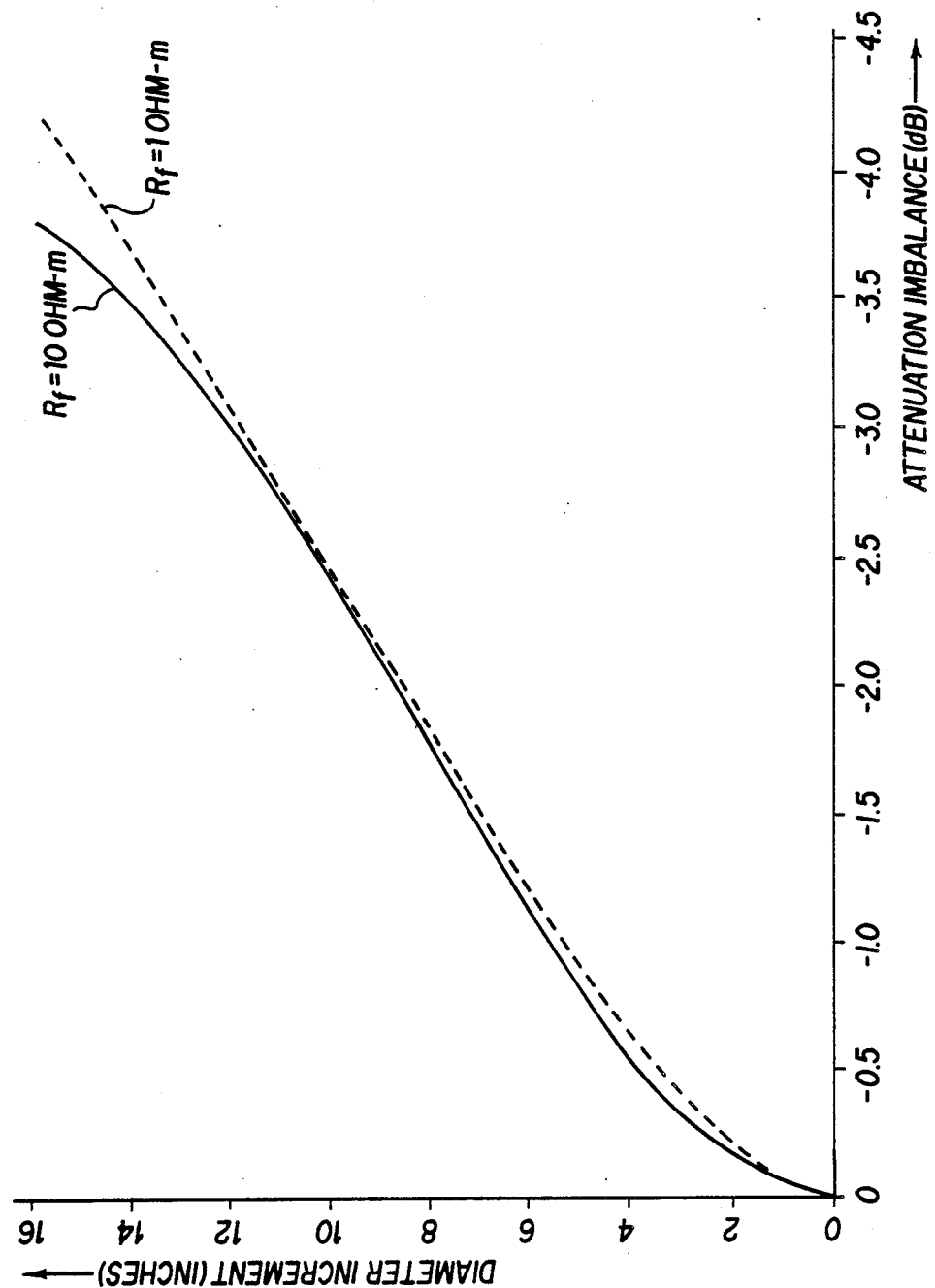
FIG. 19 shows attenuation caliper graphs for a given set of conditions.

Similarly, the borehole diameter increment can be obtained from the attenuation imbalance although, as noted above, the attenuation provides deeper investigation. FIG. 19 shows the attenuation caliper graphs which correspond to $R_m = 0.1$ ohm-m and $R_f = 1$ ohm-m and $R_f = 10$ ohm-m. The same procedure described for obtaining $\Delta D_\phi$ can be used to obtain the increment in borehole diameter from attenuation, $\Delta D_A$. From the stored data, a differential caliper log can display $\Delta D_\phi$ and/or $\Delta D_A$.

A caliper log can be obtained from $\Phi_I$ and/or $A_I$ by summing or integrating with respect to the vertical position. [See block 1681 of FIG. 16.] An initial value for the borehole diameter is required, which can be obtained from a section of borehole which is known to be in gauge with the bit size. A consolidated sandstone formation can be used as a reference, for example. The borehole diameter obtained from the phase caliper is $$D_\Phi(z) = D_\Phi(z_0) + \int_{z_0}^{z} F(\Phi_I(z'))dz', \quad (18)$$

where $D_\Phi(z_0)$ is the known diameter at $z_0$, $\Phi_I(z')$ is the measured phase shift imbalance versus depth and $F(\Phi_I(z'))$ is the phase caliper table written in functional format. The linear approximation for $F(\Phi_I)$ can also be used in the integrand.

Figure 20:
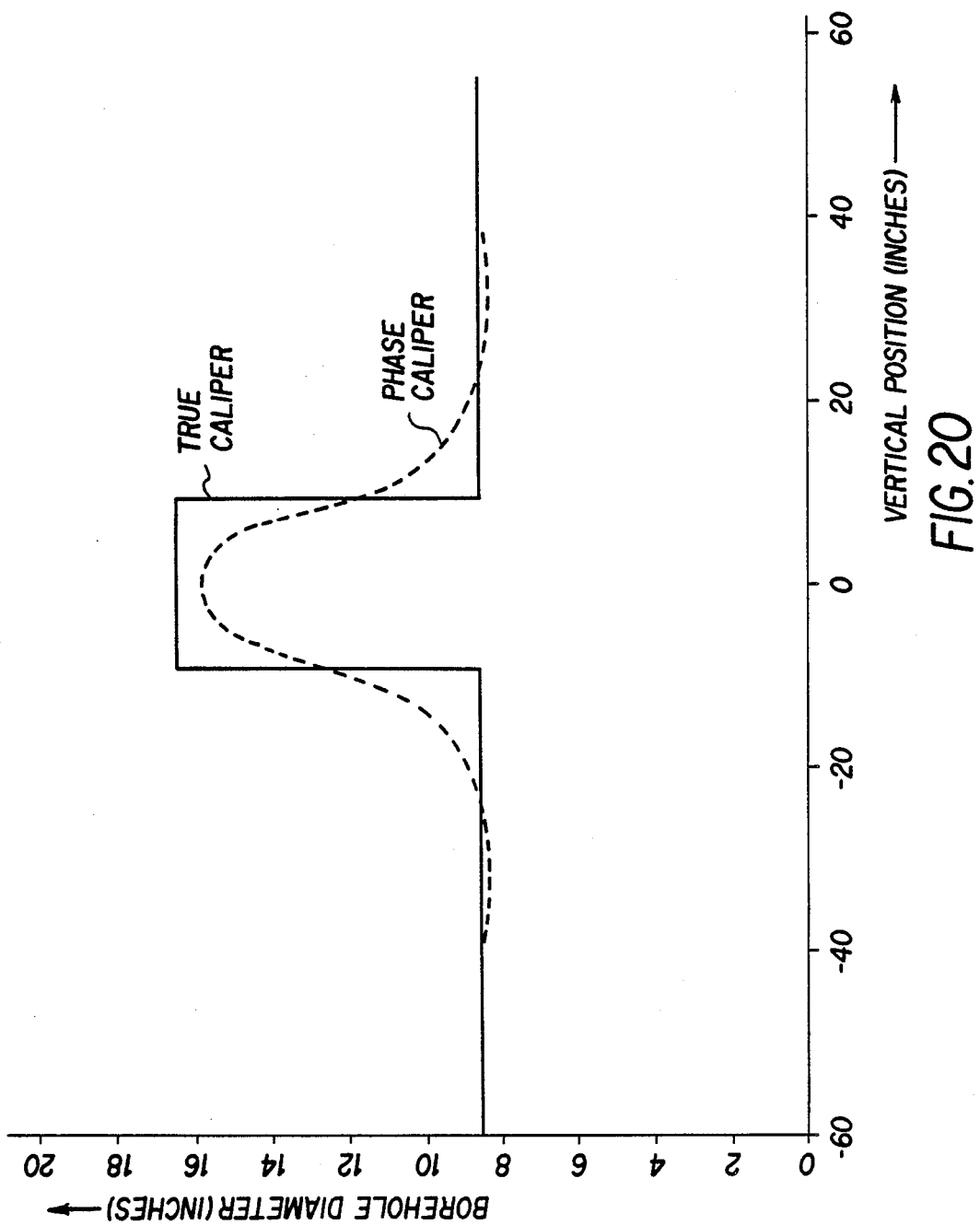
FIG. 20 shows an example of a phase caliper log for a washout or cave.

FIG. 20 shows the phase caliper log for a washout or cave 18" high and with a diameter of 16.5" in a borehole with an 8.5" diameter. The solid curve is the actual borehole diameter, and the dotted curve is the phase caliper log computed using equation (18) and a linear representation for $F(\Phi_I)$. The initial value chosen for the borehole diameter is $D_\Phi(60") = 8.5"$.

Figure 21A:
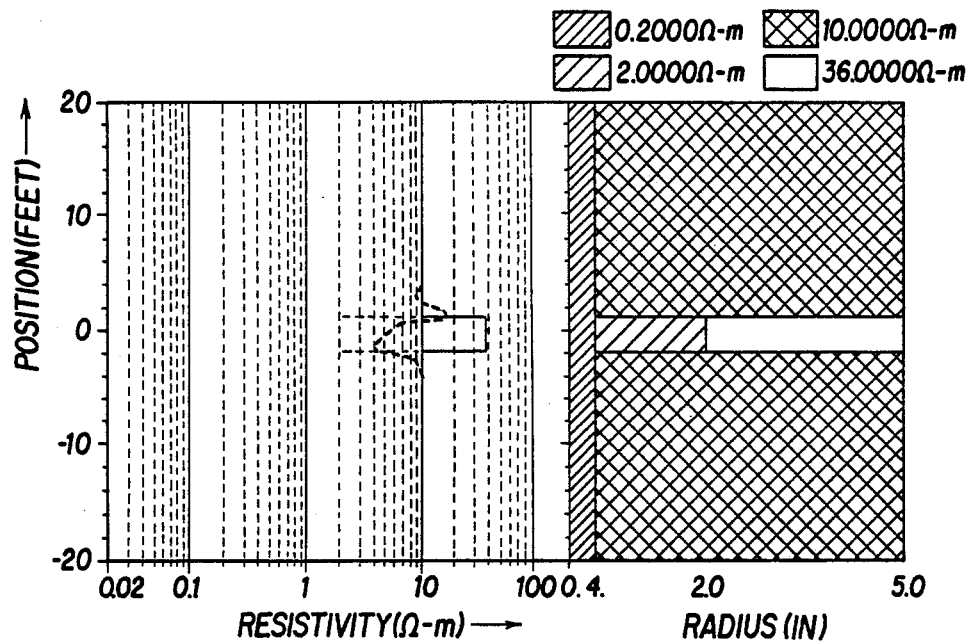
FIGS. 21A and 21B illustrate a formation model and an example of the effect of using borehole compensation.
Figure 21B:
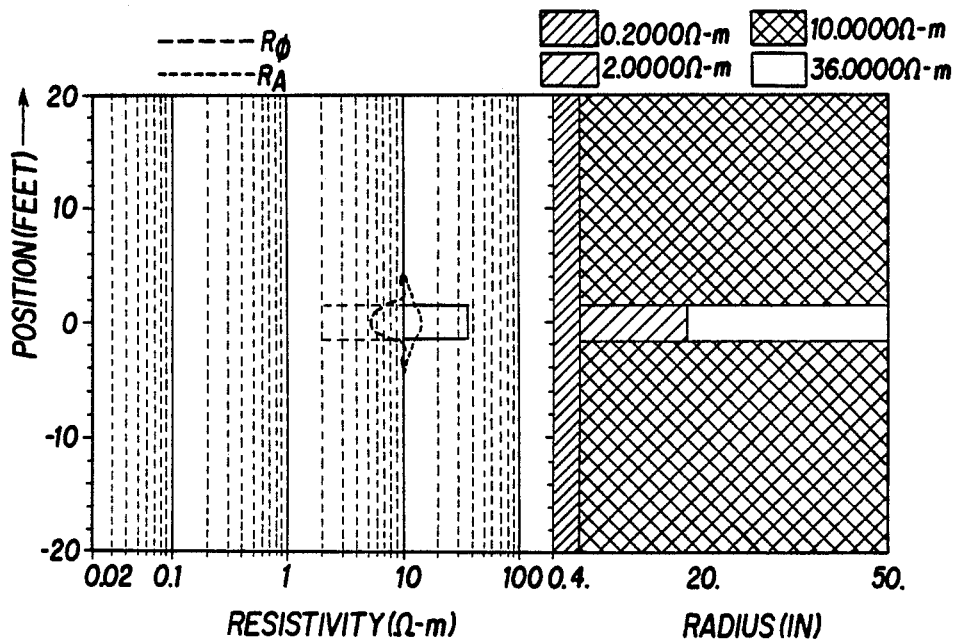

FIGS. 21A and 21B, which result from computer simulations based on the relationships set forth above, show an example of the effect of using borehole compensation. In a single transmitter system, as the logging device moves through a bed boundary, there tend to be "horns" in the processed receiver output (e.g. $R_\phi$ or $R_A$) as a result of factors such as energy reflection at the bed boundaries. These horns are evident in $R_\phi$ (shown in dashed line) near the bed boundaries in the example of FIG. 21A, which shows the case of a 3' bed of 36 ohm-m resistivity (with an invaded zone at 2 ohm-m) surrounded by formations of resistivity 10 ohm-m and mud of resistivity 0.2 ohm-m. The water saturation, $S_w$, is 25%. FIG. 21B shows the signal $R_\phi$ (in the wider dashed line) when two transmitters are used in a borehole compensated arrangement. It is seen that the horns are reduced or eliminated, and a symmetrical response for $R_\phi$ is obtained, with an indicated bed resistivity of about 5.5 ohm-m. The $R_A$ response (narrower dashed line) is also shown. It is symmetrical, and has a deeper depth of investigation, so it sees more of the virgin bed (and less of the invaded zone), and exhibits a bed resistivity of about 13 ohm-m. As seen, the measurement $R_A$ has less vertical resolution than $R_\phi$, so the bed boundaries appear wider from the $R_A$ measurement.

Figure 22A:
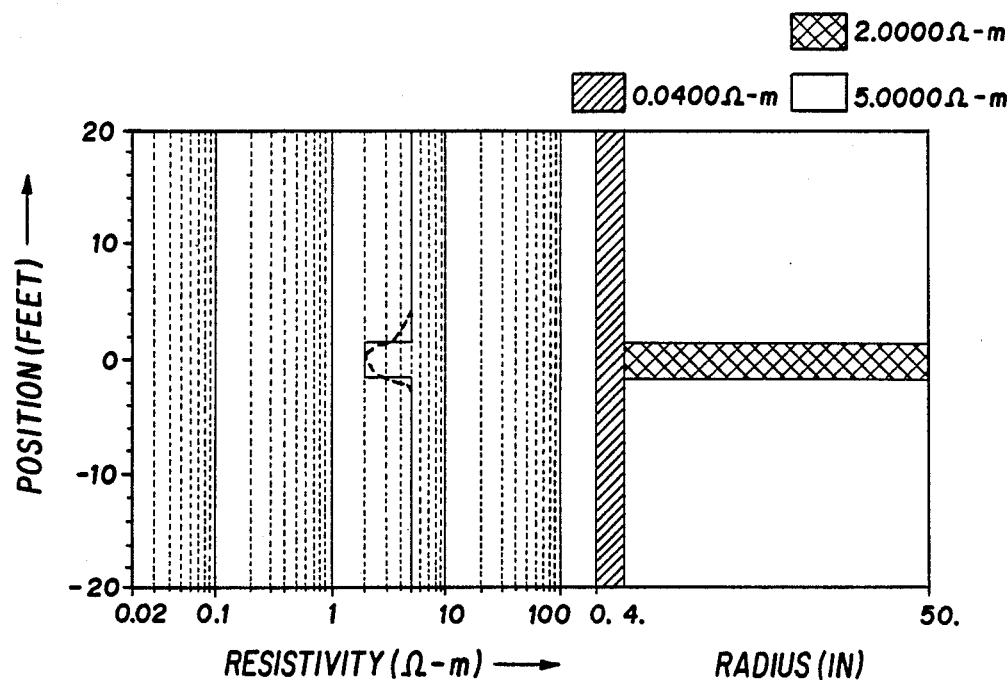
FIGS. 22A and 22B illustrate a formation model and show actual and computed apparent resistivities for another example.
Figure 22B:
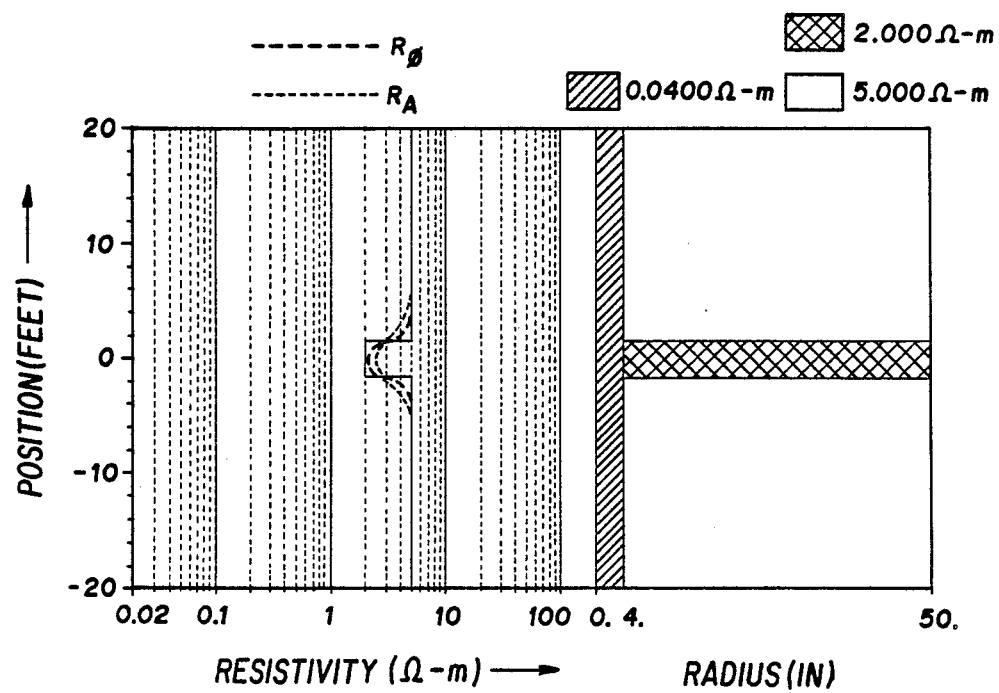

In the example of FIGS. 22A and 22B, an uninvaded 3' bed of resistivity 2 ohm-m is shown surrounded by formations of 5 ohm-m, with salt mud (0.04 ohm-m). The water saturation, $S_w$, is 100% in this case. In FIG. 22A (not borehole compensated), the $R_\phi$ response (shown in dashed line) is seen to be asymmetric. In FIG. 22B (borehole compensated case), the responses of both $R_\phi$ (wider dashed line) and $R_A$ (narrower dashed line) are symmetrical. Again, the $R_\phi$ measurement is seen to have better vertical resolution. The $R_\phi$ measurement at the bed center is seen to be very close to the 2.0 ohm-m true resistivity of the bed. Borehole compensation is also effective in reducing errors of apparent resistivity caused by caves in the borehole.

Figure 23A:
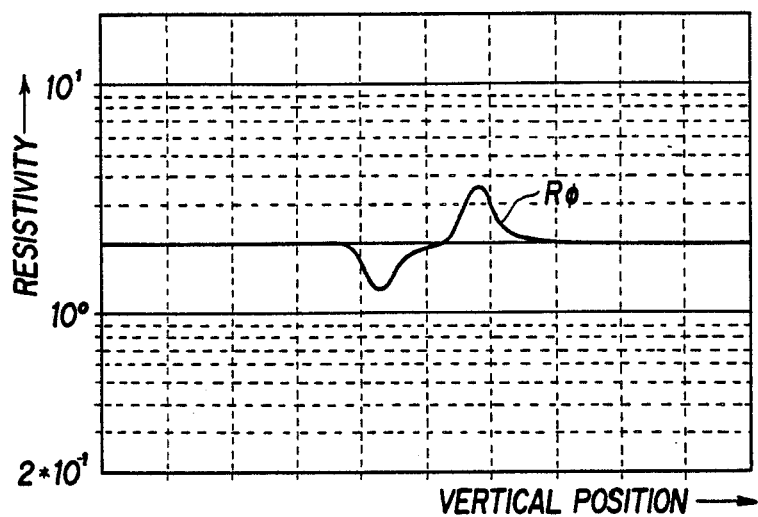
FIGS. 23A and 23B show graphs of computed apparent resistivities for an example of a cave.
Figure 23B:
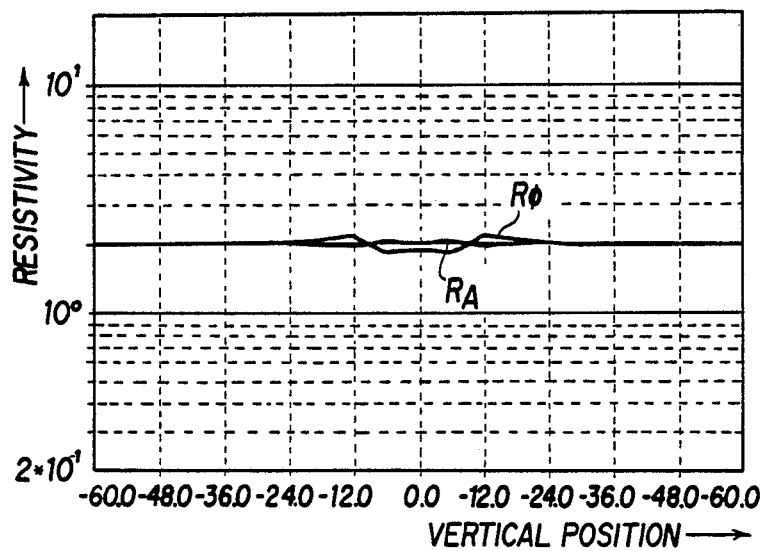

Regarding measurement of caves, the shallower phase measurement $R_\phi$ responds to caves (generally, it picks up the mud resistivity in the cave as part of the apparent resistivity), whereas the deeper attenuation measurement $R_A$ does not respond substantially to caves. This is illustrated in FIGS. 23A and 23B. FIG. 23A shows the situation (not borehole compensated) for a cave that is 0.8" deep and 18" wide, with $R_m = 0.1$ ohm-m and $R_t = 2$ ohm-m. The $R_\phi$ measurement looks like it is responding to one or more thin beds. [This is also seen in FIG. 23B (same conditions—but borehole compensated). FIG. 23B also shows $R_A$, but it is hardly visible along the 2 ohm-m line, since it does not respond significantly to the cave.] Therefore, a phase shift measurement ($R_\phi$) alone is not good for distinguishing between a bed and a cave. However, by also observing the response of the attenuation measurement ($R_A$), or the absence thereof, one can distinguish between a cave and a bed. The routine for the processor for implementing this procedure is set forth hereinbelow in conjunction with FIG. 25.

Figure 24:
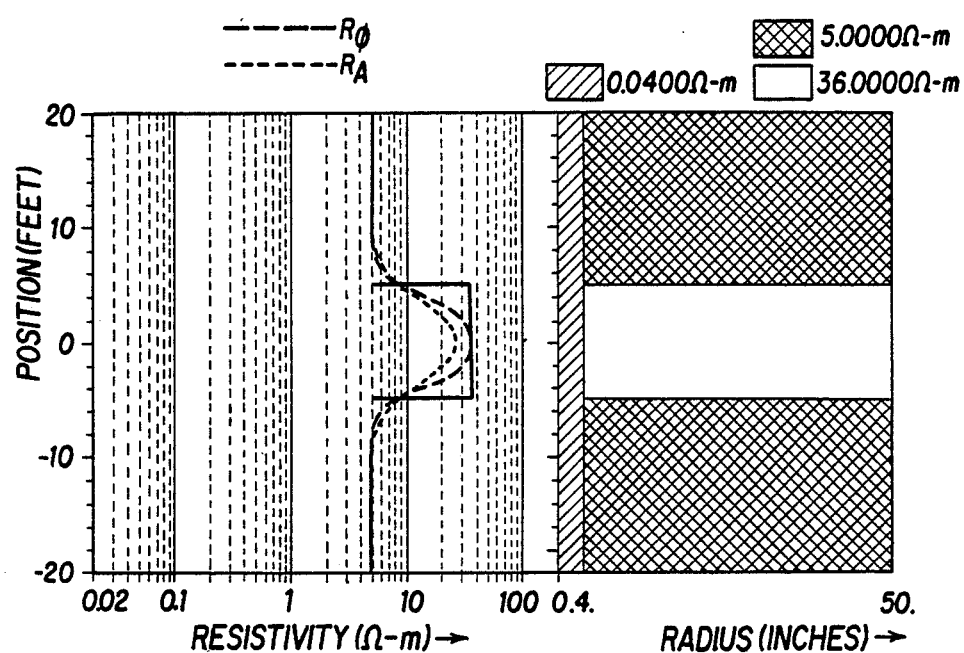
FIG. 24 is a further example showing true resistivity, and resistivities derived from phase shift and attenuation measurements, and shows that the bed boundaries occur at crossovers of the apparent resistivities.

In addition to identifying the presence of a bed, it is desirable to locate its boundaries as accurately as possible. In accordance with a feature of the invention, the crossover of the apparent resistivities, $R_\phi$ and $R_A$, is found to occur, with good accuracy, on the actual bed boundary. As observed above (e.g. in FIG. 22B), as the logging device moves past a bed boundary, $R_A$ changes relatively slowly from the shoulder bed resistivity toward the thin bed resistivity. $R_\phi$ will remain close to the shoulder bed resistivity for a longer period and then change more suddenly toward the thin bed resistivity. The depth levels at which $R_A$ and $R_\phi$ coincide is the crossover point. As seen in FIG. 22B, this occurs directly at the actual bed boundary. FIG. 24 shows another illustrative example. In this case there is a 10' wide bed of resistivity 36 ohm-m in a 5 ohm-m formation with $S_w = 25\%$, and with salt mud (0.04 ohm-m). The curve $R_\phi$ is shown in the wider dashed line and the curve $R_A$ in the narrower dashed line. The crossover points are seen to occur on the actual bed boundaries.

It is also desirable to locate the edges of a cave, and determine its depth. The phase shift imbalance, $\Phi_I$, discussed above, provides information in this regard, since a cave edge will appear as peak of the differential borehole caliper (from $\Phi_I$), and the height of the peak is dependent on the cave depth.

Figure 25A:
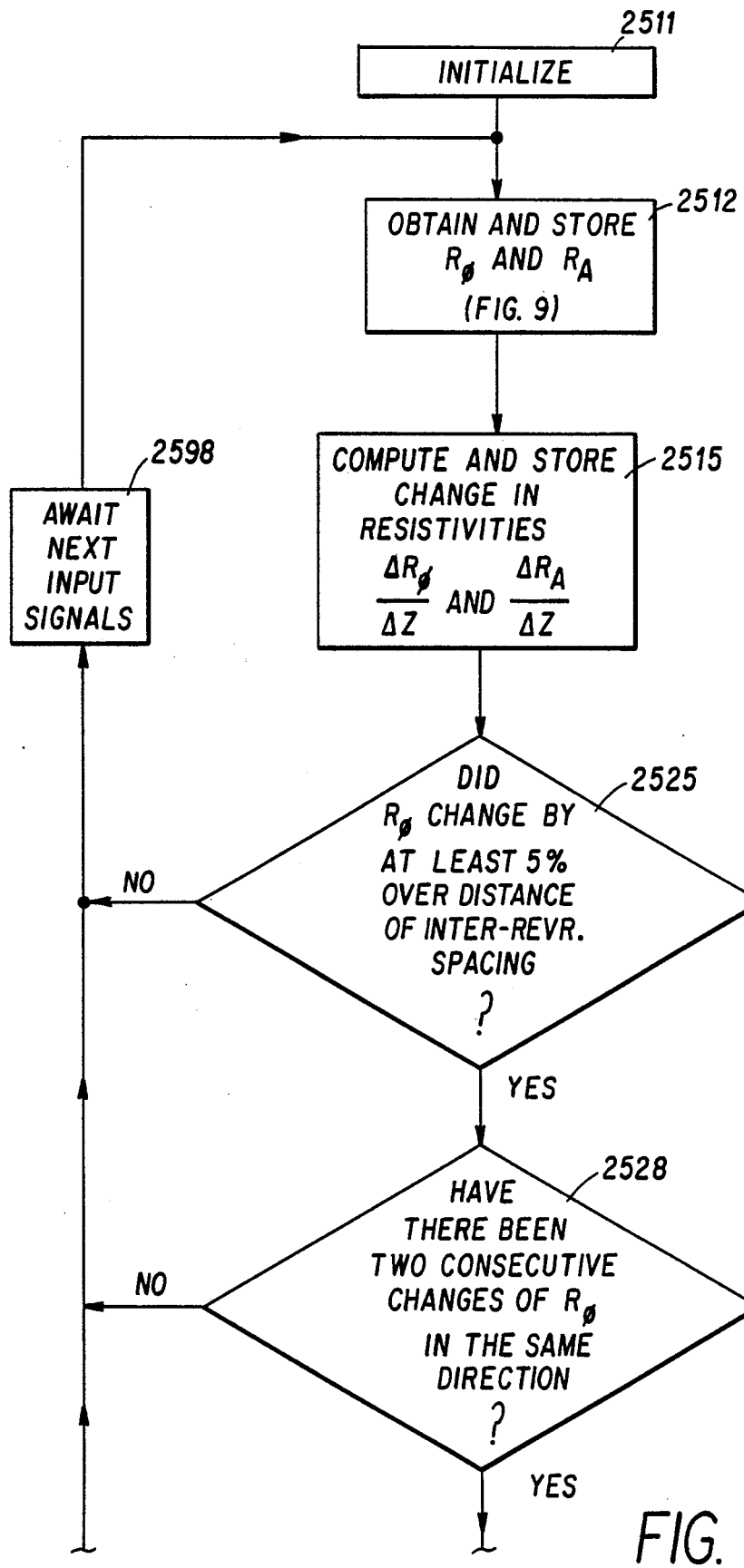
FIGS. 25A and 25B placed one below another, is a flow diagram of a routine for programming the processor to distinguish between caves and beds, and to determine characteristics thereof and the location of boundaries.
Figure 25B:
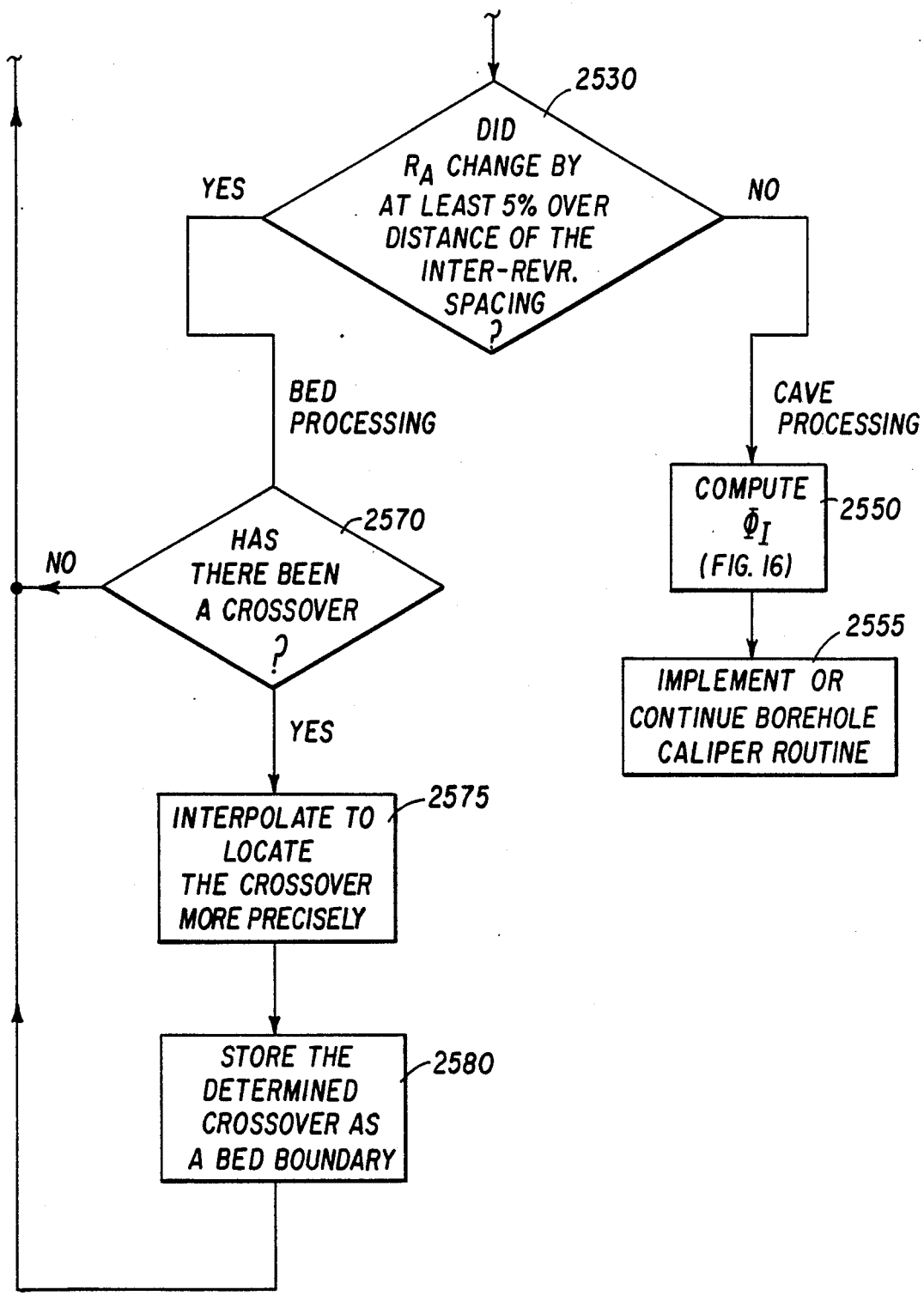

Referring to FIG. 25, there is shown a flow diagram of a routine for programming the processor (downhole or uphole) to distinguish between caves and beds, and to determine the location of boundaries and properties thereof. The block 2511 represents initialization of parameters, for example, borehole diameter in a known region, properties of the mud, etc., as previously described. The block 2512 represents the processing of the signals from the current depth level (or clock reference) to obtain $R_\phi$ and $R_A$, as previously described, for example in conjunction with FIG. 9. The block 2515 is then entered, this block representing computation and storage of the change in apparent resistivities; namely, the change in each of the values $R_\phi$ and $R_A$ with respect to the previous value of same, taken over a given increment of depth. Decision diamond 2525 is then entered, and inquiry is made as to whether or not $R_\phi$ has changed by as least a predetermined percentage, for example 5%, over the distance of the inter-receiver spacing. This test is to determine that there has been a substantial change in $R_\phi$ that could indicate a boundary of a bed or cave. If this condition is not met, there is a return to block 2598, and the arrival of the next signal information is awaited. If, however, the condition is met, decision diamond 2528 is entered, and inquiry is made as to whether or not there have been consecutive changes of $R_\phi$ in the same direction. This test, which is optional, is for the purpose of eliminating excursions that are due, for example, to noise, and do not generally indicate the presence of a substantial bed or cave. If the test is not met, there is return to block 2598, but if the test is met, decision diamond 2530 is entered.

If and when the decision diamond 2530 is reached, there has been a substantial change in $R_\phi$, and $R_A$ is now examined to distinguish between a cave and a bed; recalling that $R_A$ does not substantially respond to a cave but generally does respond to a bed. In the test of block 2530, a determination is made as to whether or not $R_A$ changed by a predetermined percentage, for example 5%, over the distance of the inter-receiver spacing. If not, the presence of a cave is indicated, and the block 2550 is entered to implement processing for a cave. If the condition is met, a bed is indicated, and diamond 2570 is entered.

In the event of a negative response to the inquiry of diamond 2530, processing can be performed that is similar to the borehole caliper processing described in conjunction with FIG. 16. In other words, the cave can be viewed as a variation in borehole diameter. Accordingly, the block 2550 represents the computation of the phase shift imbalance, $\Phi_I$, in accordance with the routine of FIG. 16. The borehole caliper routine can then be implemented (or continued) to obtain and store $\Delta D$ and $D_z$, as previously described. This is represented by the block 2555.

If the test of diamond 2530 indicated a bed, diamond 2570 is entered, and inquiry is made as to whether or not there has been a crossover between $R_\phi$ and $R_A$. As described above, bed boundaries are located at crossovers between these two apparent resistivities. The presence of a crossover can be detected by determining the sign of the ratio:

$$[R_A(z_N) - R_\phi(z_N)] / [R_A(z_{N-1}) - R_\phi(z_{N-1})] \quad (19)$$

If there is no crossover, this quantity will be positive (since the same one of the resistivities will be greater at the two successive depth levels of interest), whereas if there has been a crossover, the numerator and denominator will have different signs, so the indicated quantity will be negative. If no crossover is noted, the block 2598 is entered. If there is a crossover, block 2575 is entered, this block representing the performance of an interpolation to located the depth level of the crossover point more precisely. The interpolation of block 2575 utilizes the following relationship:

$$z_{boundary} = z_{N-1} - \frac{[R_A(z_{N-1}) - R_\phi(z_{N-1})][(z_N - z_{N-1})]}{R_A(z_N) - R_\phi(z_N) - R_A(z_{N-1}) + R_\phi(z_{N-1})} \quad (20)$$

Figure 25C:
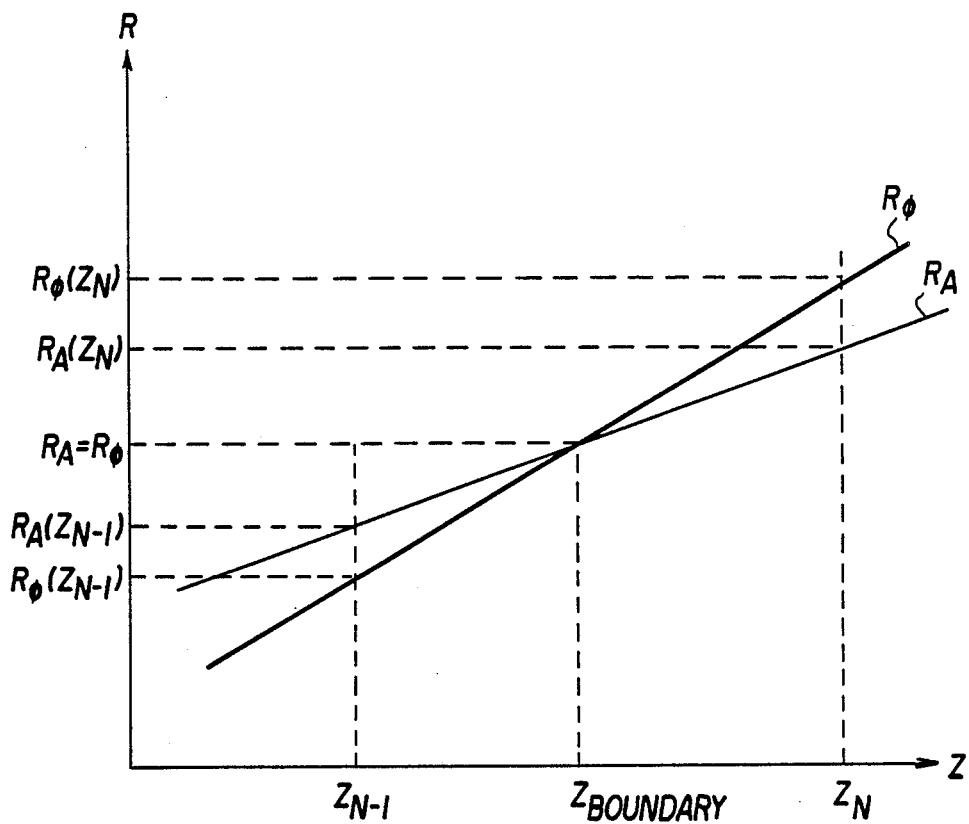
FIG. 25C is a graph which illustrates the interpolation used in the routine of FIGS. 25A and 25B.

This relationship (20) provides a linear interpolation that yields the value $z_{boundary}$, as illustrated in FIG. 25C. The determined crossover point can then be stored as the next bed boundary, as represented by the block 2580, and the block 2598 can then be reentered for continuation of processing.

Figure 26:
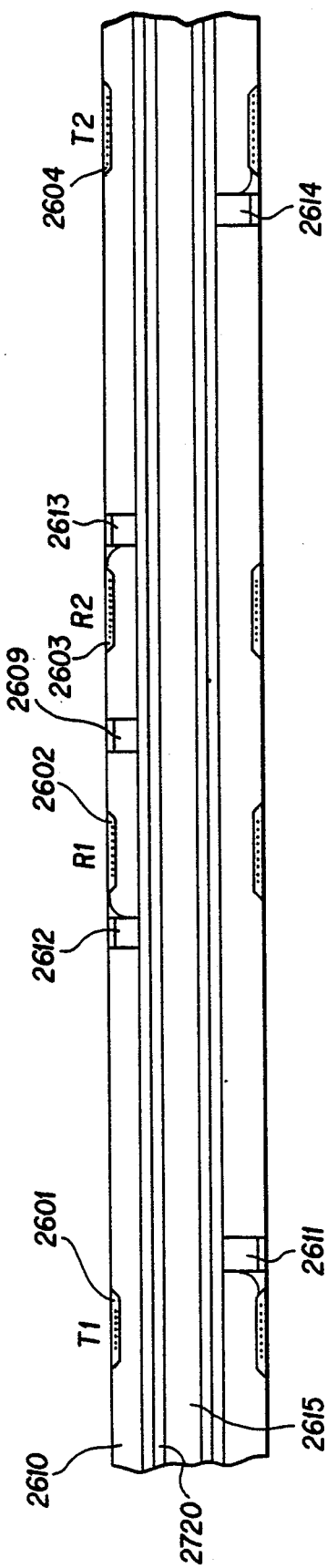
FIG. 26 is a cross-sectional view of a logging device in accordance with an embodiment of the invention.

FIG. 26 shows an embodiment of a measuring apparatus 200 as utilized in the logging while drilling system of FIG. 1, and which has two transmitters and can be used in implementing various features of the invention. In the configuration of FIG. 26, the antennas and part of the associated electronics are formed in a section of drill collar 2610, which comprises metal cylinder having a central bore 2615 through which the drilling fluid flows. [It will be understood that provision for flow of drilling fluid through elements such as 58, 53, 57 and 56 can be through a central bore (with the components in an annular configuration), or the components can be provided in a central region, with an annulur opening provided for mud flow.]

Recesses 2601, 2602, 2603 and 2604 are machined in the drill collar 2610. The recesses are sufficiently shallow to maintain the mechanical integrity of the drill collar. The transmitting antenna T1, the receiving antennas R1 and R2, and the transmitting antenna T2 each comprise a coil wound on an insulating medium in a respective recess (2601-2604). As illustrated further in FIG. 27, which shows one of the receving antennas, a base layer of insulating material such as fiberglass epoxy 2635 is formed in the recess, and the coil is wound on the insulating material and covered with more fiberglass epoxy 2636. A layer of rubber 2640, such as Viton rubber, covers the coil, and serves to protect the coil and the fiberglass from the incursion of water that can degrade the effectiveness of the coil or damage the insulator. The rubber layer is seated on shoulders 2641 of the recess. A shield 2660, for example of the type described in my U.S. Pat. No. 4,536,714, is provided over the recess. The shield is in the form of a conductive metal cylinder that has slots in the axial direction. The slots permit passage of the desired transverse electric electromagnetic waves, but transverse magnetic components are effectively shielded from passing to or from the coil (as the case may be), since a shorting current path is provided for these components. In the illustrated embodiment, the shield is mounted on shoulders 2665 of the recess, and fastening screws (not shown) are provided to secure the shield in place. A further layer of rubber 2668 is provided on the underside of the shield surface and also fills the slots of the shield.

Figure 27:
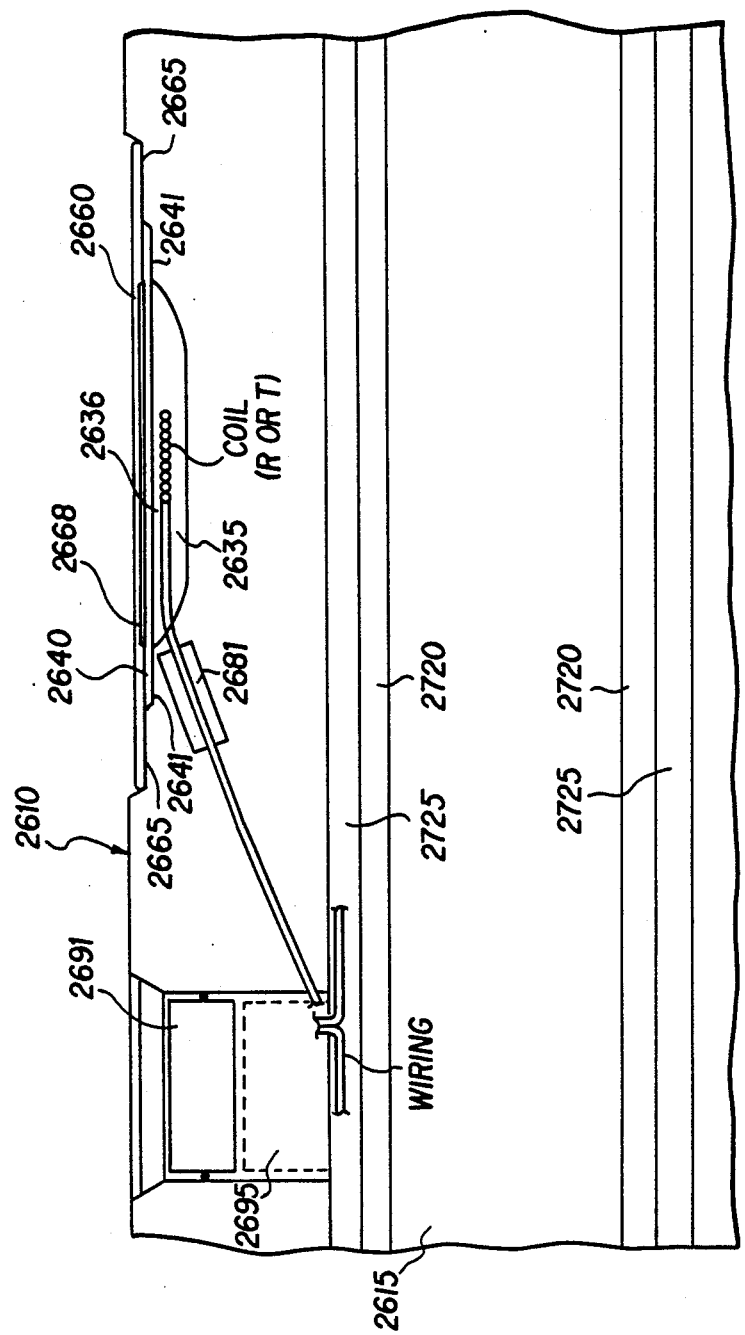
FIG. 27 shows further detail of the logging device of FIG. 26.

In the illustrated embodiment of FIG. 26, each of the antennas has an adjacent compartment formed in the drill collar, the compartments associated with T1, R1, R2, and T2 being designated by reference numerals 2611, 2612, 2613, and 2614, respectively. As seen in FIG. 27, each compartment has a removable metal pressure-tight cap 2691. The compartments associated with the receivers each contain signal conditioning means which, in the present embodiment, include impedance matching (e.g. a balun circuit) and a preamplifier, as represented in FIG. 27 by the dashed block 2695. These circuits are shown in FIG. 14 as blocks 230 and 231 (or 240 and 241), for example. For the compartments adjacent the transmitter, the dashed block 2695 would contain impedance matching (e.g. a tuning circuit), as represented by the block 220 or 1420 in FIG. 14. The two ends of the coil, or conductors coupled thereto, are coupled through commercially available pressure feed-throughs 2681 (one of which is visible in FIG. 27) to their respective compartments.

A pressure-tight sleeve 2720 is provided adjacent the inner surface of drill collar 2610. The passage 2725 within the sleeve communicates with each compartment and carries wiring to the transmitters T1 and T2, from the receivers R1 and R2, and to and from the acquisition and processor electronics 58 (FIG. 1), power source, etc. In operation, the preamplification and impedance matching of the receiver signals at a location that is close to the receivers tends to reduce the effect of noise, particularly cross talk from the transmitter cabling. In the embodiment of FIG. 26, a further pressure-tight compartment 2609, which also communicates with the passage 2725, is located between the receiving antennas, and contains the switch 250 and amplifier 251 (FIG. 14).

The invention has been described with reference to particular preferred embodiments, but variations within the spirit and scope of the invention will occur to those skilled in the art. For example, it will be understood that while equations set forth are based on the theory of magnetic dipole radiation in homogeneous media, the principles set forth apply in general to antennas which transmit or receive primarily transverse electric fields. Also, it will be understood that in formulating the look-up tables hereof (or implementing corresponding processing), additional factors can be taken into account, as desired, for example: features of subsurface geology, the presence of an adjacent bed with specified resistivity, the presence of a certain thickness of mudcake with a specified resistivity, a predetermined degree of invasion, the specific tool geometry, and the size and geometry of the sensors. Also, the look-up table information can be developed empirically.

We claim:

1. Apparatus for determining properties of formations surrounding a borehole, comprising:
   a logging device adapted for movement generally centrally through a borehole,
   upper and lower spaced transmitter means formed in said logging device;
   upper and lower spaced receiver means formed in said logging device between said upper and lower transmitter means on a substantially common axis therewith;
   means for alternately energizing said transmitter means with transverse electric electromagnetic energy having a frequency in the range 0.1 MHz to 10 MHz;
   means for detecting at least one electrical characteristic of energy received at the lower receiver means relative to energy received at the upper receiver means during energizing of the upper transmitter means, and for generating a first output signal therefrom;
   means for detecting at least one electrical characteristic of energy received at the upper receiver means relative to the energy received at the lower receiver means during energizing of the lower transmitter means, and for generating a second output signal therefrom; and
   means for determining a property of the formations as a function of the combined first and second output signals.

2. Apparatus as defined by claim 1, wherein said electrical characteristic is phase shift, and wherein said determined property is the formation resistivity.

3. Apparatus as defined by claim 1, wherein said electrical characteristic is attenuation, and wherein said determined property is the formation resistivity.

4. Apparatus as defined by claim 1, wherein said upper and lower receiver means are symmetrically spaced between said upper and lower transmitter means.

5. A method for determining properties of formations surrounding a borehole, comprising the steps of:
   alternately transmitting transverse electric electromagnetic energy having a frequency in the range 0.1 MHz to 10 MHz from upper and lower spaced transmitter locations in the borehole;
   receiving energy at upper and lower spaced receiver locations between the transmitter locations;
   detecting at least one electrical characteristic of energy received at the lower receiver location relative to energy received at the upper receiver location during transmitting from the upper transmitter location, and generating a first output signal therefrom;
   detecting at least one electrical characteristic of energy received at the upper receiver location relative to the energy received at the lower receiver location during transmitting from the lower transmitter location, and generating a second output signal therefrom; and
   determining a property of the formations as a function of the combined first and second output signals.

6. Apparatus as defined by claim 1, wherein each of said transmitter means and each of said receiver means comprises a coil wound around the axis of said logging device.

7. Apparatus as defined by claim 2, wherein each of said transmitter means and each of said receiver means comprises a coil wound around the axis of said logging device.

8. Apparatus as defined by claim 3, wherein each of said transmitter means and each of said receiver means comprises a coil wound around the axis of said logging device.

* * * * *